US011913263B2

(12) United States Patent
Nakasone

(10) Patent No.: US 11,913,263 B2
(45) Date of Patent: Feb. 27, 2024

(54) LOCK DEVICE FOR OPENING/CLOSING BODY

(71) Applicant: PIOLAX, INC., Kanagawa (JP)

(72) Inventor: Hisashi Nakasone, Kanagawa (JP)

(73) Assignee: PIOLAX, INC., Kanagawa (JP)

(*) Notice: Subject to any disclaimer, the term of this patent is extended or adjusted under 35 U.S.C. 154(b) by 458 days.

(21) Appl. No.: 17/285,341

(22) PCT Filed: Oct. 15, 2019

(86) PCT No.: PCT/JP2019/040416
§ 371 (c)(1),
(2) Date: Apr. 14, 2021

(87) PCT Pub. No.: WO2020/080344
PCT Pub. Date: Apr. 23, 2020

(65) Prior Publication Data
US 2021/0370840 A1 Dec. 2, 2021

(30) Foreign Application Priority Data
Oct. 18, 2018 (JP) ................................. 2018-196696

(51) Int. Cl.
E05B 83/30 (2014.01)
B60R 7/06 (2006.01)
(Continued)

(52) U.S. Cl.
CPC ............... *E05B 83/30* (2013.01); *B60R 7/06* (2013.01); *E05B 79/08* (2013.01); *E05B 85/06* (2013.01); *E05C 9/043* (2013.01)

(58) Field of Classification Search
CPC ... B60R 7/06; E05B 9/04; E05B 79/06; E05B 79/08; E05B 83/28; E05B 83/30; E05B 83/32; E05B 85/06
(Continued)

(56) References Cited

U.S. PATENT DOCUMENTS 10,738,511 B2 * 8/2020 Nakasone .............. E05C 9/04
10,794,097 B2 * 10/2020 Ruzich .................. E05B 5/00
(Continued)

FOREIGN PATENT DOCUMENTS

JP 2014-173287 A 9/2014
JP 6114578 B2 4/2017
(Continued)

OTHER PUBLICATIONS

Dec. 3, 2019, International Search Report issued for related PCT application No. PCT/JP2019/040416.
(Continued)

Primary Examiner — Jason S Daniels
(74) Attorney, Agent, or Firm — Paratus Law Group, PLLC

(57) ABSTRACT

Provided is a lock device for an opening/closing body, the device having a reduced number of parts and enabling a key cylinder to be removed with greater ease. The lock device comprises a lock part, a lock member which is operated via a manipulation member, a base member, and a key cylinder, wherein: the manipulation member comprises a cylinder housing part; the base member comprises a cylinder arrangement space in which the cylinder housing part is arranged, a wall part located at the tip side of the manipulation member, and an opening formed in the wall part; the key cylinder comprises a key plate; the key plate comprises a pressing surface; and the pressing surface is exposed inside the cylinder arrangement space and disposed further to the base end part side of the manipulation member than the edge part of the opening in the wall part.

6 Claims, 23 Drawing Sheets

(51) Int. Cl.
E05B 79/08 (2014.01)
E05B 85/06 (2014.01)
E05C 9/04 (2006.01)

(58) Field of Classification Search
USPC .............................................. 296/37.8, 37.12
See application file for complete search history.

(56) References Cited

U.S. PATENT DOCUMENTS

| | | | |
|---|---|---|---|
| 11,377,884 B2* | 7/2022 | Nakasone | ................. E05C 9/04 |
| 2011/0174027 A1* | 7/2011 | Ookawara | ............... E05C 9/047 |
| | | | 70/159 |
| 2014/0150505 A1 | 6/2014 | Shimizu | |
| 2018/0328087 A1 | 11/2018 | Nakasone | |

FOREIGN PATENT DOCUMENTS

| | | |
|---|---|---|
| WO | WO 2013/018496 A1 | 2/2013 |
| WO | WO 2014/030531 A1 | 2/2014 |
| WO | WO 2017/086426 A1 | 5/2017 |

OTHER PUBLICATIONS

Dec. 3, 2019, International Search Opinion issued for related PCT application No. PCT/JP2019/040416.

* cited by examiner

LOCK DEVICE FOR OPENING/CLOSING BODY

CROSS REFERENCE TO PRIOR APPLICATION

This application is a National Stage Patent Application of PCT International Patent Application No. PCT/JP2019/040416 (filed on Oct. 15, 2019) under 35 U.S.C. § 371, which claims priority to Japanese Patent Application No. 2018-196696 (filed on Oct. 18, 2018), which are all hereby incorporated by reference in their entirety.

TECHNICAL FIELD

The present invention relates to a lock device for an opening and closing body for locking, in a closed state, an opening and closing body that is attached to an opening portion of a fixed body in an openable and closable manner.

BACKGROUND ART

For example, an opening and closing body such as a lid is attached to an opening portion formed in a fixed body such as a glove compartment of an automobile, in an openable and closable manner. A lock device that is locked when the opening and closing body is closed and can be unlocked when opening the opening and closing body is provided between the opening portion and the opening and closing body. As the lock device, a lock device having a key cylinder and capable of key-locking a locked state of an opening and closing body is also known.

As the lock device having the key cylinder, PTL 1 discloses a lock device including a housing unit attached to an opening and closing member, a lock member configured to set the opening and closing member to a locked state with respect to an attached member, and a key cylinder provided to a second member and capable of regulating movement of the lock member. The housing unit is constituted by a lower member configured to rotationally support a rotor member and having a connection hole and an upper member removably mounted to the lower member and having the key cylinder. The upper member is constituted by an upper main body member having a connecting claw configured to connect to the connection hole of the lower member and an operation member rotatably attached to the upper main body member via a pivotally support part and a bearing part and having the key cylinder arranged thereon.

For example, when it is desired to replace the key cylinder arranged in the opening and closing member such as a glove compartment due to loss of a car key, the operation member is completely opened, and the connecting claw is pushed and separated from the connection hole by, a jig, so that a connected state of the lower member and the upper member is released and the upper member is removed from the lower member. Then, the key cylinder is removed from the operation member, so that the key cylinder can be replaced.

CITATION LIST

Patent Literature

PTL 1: Japanese Patent No. 6,114,578B

SUMMARY OF INVENTION

Technical Problem

In the lock device of PTL 1, the upper member is constituted by the two components of the operation member and the upper main body member, so that the number of components is large. In addition, the key cylinder can be removed from the operation member only after the upper main body member is removed from the lower member, so that there is a problem from a standpoint of removing operability of the key cylinder.

It is therefore an object of the present invention to provide a lock device for an opening and closing body capable of improving removing operability of a key cylinder while reducing the number of components.

Solution to Problem

In order to achieve the above object, the present invention provides a lock device for an opening and closing body that is attached to an opening portion of a fixed body in an openable and closable manner, the lock device including:

a lock portion provided on the opening portion of the fixed body or the opening and closing body;

a lock member configured to operate via an operation member to be engaged with or disengaged from the lock portion;

a base member having a rotation support portion rotationally supporting the operation member; and a key cylinder capable of keeping or releasing a locked state of the lock member to the lock portion, in which the operation member includes a base end portion rotationally supported to the rotation support portion, a gripping part provided on a tip end-side and a tubular cylinder accommodation part accommodating the key cylinder, and is configured to slide the lock member in a direction of not engaging with the lock portion by a rotation of the gripping part in a direction of separating from the base member, the base member includes a cylinder arranging space in which the cylinder accommodation part is arranged, a wall part located on a tip end-side of the operation member, and an opening formed in the wall part and communicating with the cylinder arranging space, the key cylinder includes a main body part accommodated in the cylinder accommodation part and extending in an axial direction and a key plate protruding and urged in a radially outer direction of the main body part and configured to engage with an opening portion on a rear side of the cylinder accommodation part to prevent the main body part from coming off, and the key plate includes a pressing surface configured to be pressed against an urging force of the key plate to enable the key plate to be pushed in a direction of not engaging with the opening portion on the rear side of the cylinder accommodation part, and the pressing surface is exposed into the cylinder arranging space and is arranged on a further base end portion-side of the operation member than an edge portion of the opening of the wall part.

Advantageous Effects of Invention

According to the present invention, the main body part of the key cylinder is accommodated in the cylinder accommodation part of the operation member, and the key plate is engaged with the opening portion on the rear side of the cylinder accommodation part and is exposed into the cylinder arranging space of the base member. Therefore, when it is desired to remove the key cylinder from the cylinder accommodation part of the operation member, a release tool is inserted, from an outside of the base member, into the opening of the wall part communicating with the cylinder arranging space, thereby pushing the key plate against the urging force of the key plate. Thereby, the engaged state of the cylinder accommodation part with the opening portion on the rear side is released, so that the key cylinder can be removed from the opening portion on a front side of the cylinder accommodation part.

In this way, the engaged state of the key plate and the opening portion on the rear side of the cylinder accommodation part is released through the opening provided to the base member, so that the key cylinder can be removed from the cylinder accommodation part. Therefore, as compared to a structure such as the lock device of PTL 1 where the key cylinder can be removed from the operation member only after the upper member constituted by the two components of the operation member and the upper main body member is removed from the lower member, it is not necessary to provide components such as the upper main body member, so that it is possible to reduce the number of components.

BRIEF DESCRIPTION OF DRAWINGS

FIG. 12A is a bottom view in a released state of a key lock and FIG. 12B is a bottom view of a key locked state.

FIG. 22A is a bottom view in a released state of a key lock and FIG. 22B is a bottom view of a key locked state.

FIG. 24A is a bottom view in a released state of a key lock and FIG. 24B is a bottom view of a key locked state.

DESCRIPTION OF EMBODIMENTS

Hereinbelow, an embodiment of the lock device for an opening and closing body according to the present invention will be described with reference to FIGS. 1 to 19.

Figure 1:
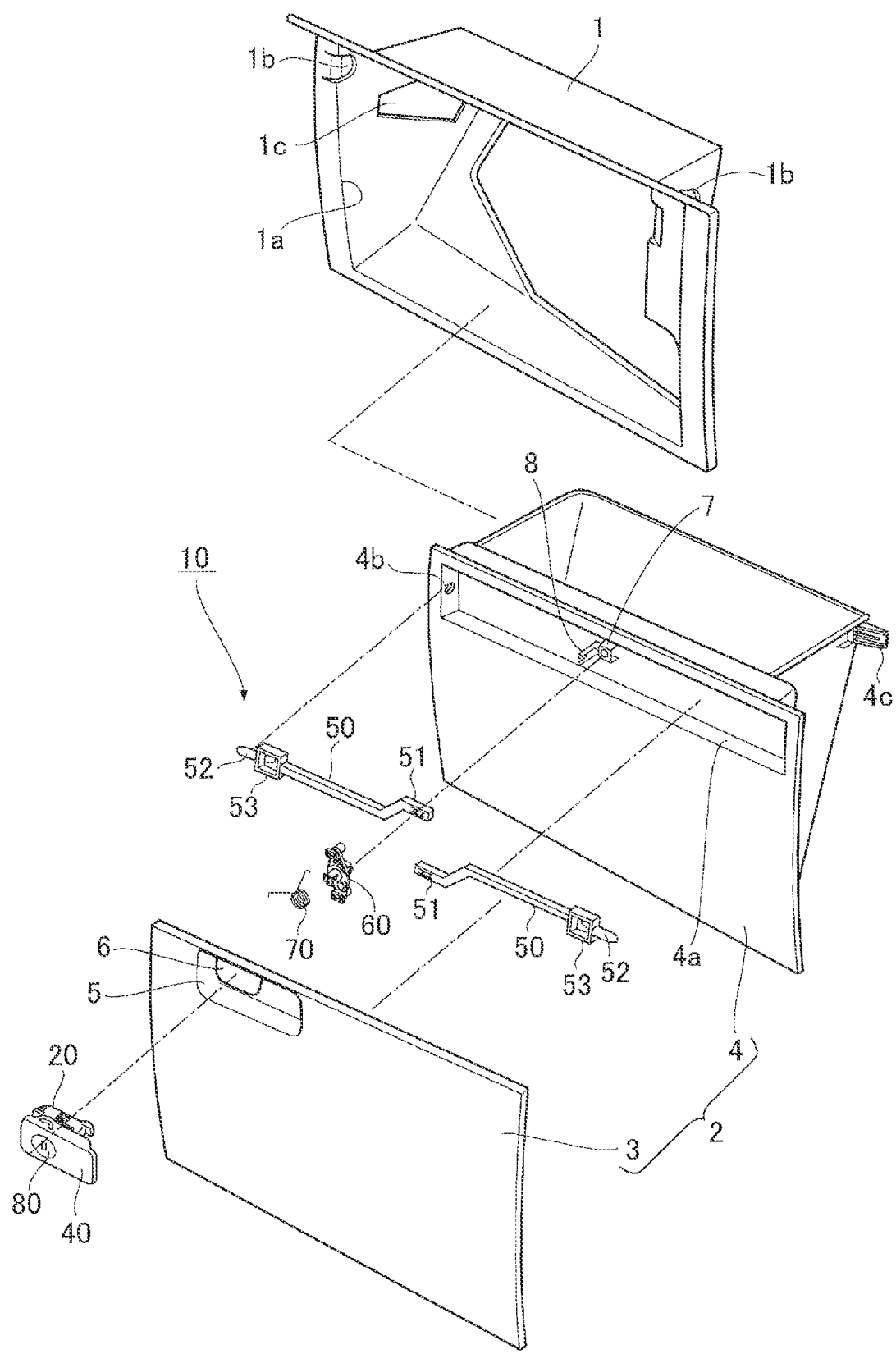
FIG. 1 is an exploded perspective view depicting an embodiment of the lock device for an opening and closing body of the present invention.
Figure 16:
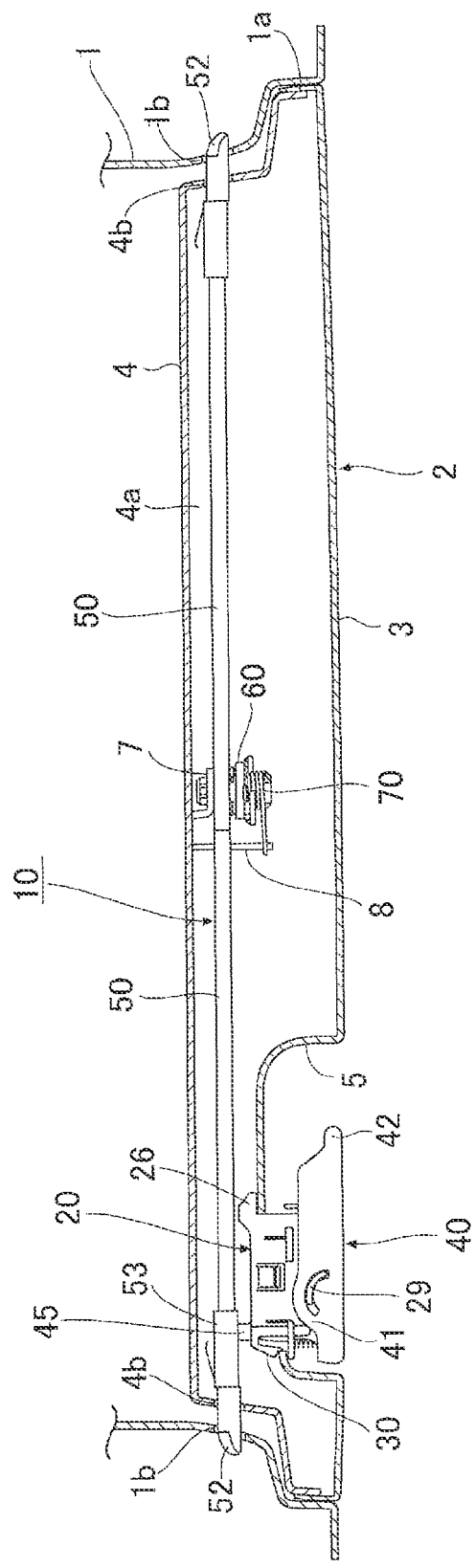
FIG. 16 is a plan view depicting a case where the opening and closing body is locked in a closed state in the lock device.

As shown in FIGS. 1 and 16, a lock device 10 for an opening and closing body (hereinbelow, referred to as "lock device 10") of the present embodiment is used, for example, for open/close-locking an opening and closing body 2 such as a glove compartment that is attached to an opening portion 1a of a fixed body 1 such as an instrument panel of a vehicle in an openable and closable manner.

The lock device 10 of the present embodiment includes an attachment hole 6 formed in the opening and closing body 2, a pair of lock portions 1b and 1b provided to the opening portion 1a of the fixed body 1, a base member 20 inserted and attached from a front side of the attachment hole 6, a pair of lock members 50 and 50 slidably arranged with respect to the opening and closing body 2 and configured to operate via an operation member 40 to be engaged with or disengaged from the lock portions 1b and 1b, a rotary member 60 configured to interlock slide operations of the pair of lock members 50 and 50, a first urging means 70 for urging each lock member 50 in a direction of engaging with the lock portion 1b, and an operation member 40 having a base end portion 41, which is rotatable attached to the base member 20 via a rotation support portion 29, and configured to slide the lock members 50 by causing a gripping part 42 to come close to or to separate from the base member 20.

Note that, in the present embodiment, the attachment hole 6 is formed in the opening and closing body 2, and the lock members 50 are slidably arranged with respect to the opening and closing body 2. However, the attachment hole may be formed in the fixed body, and the lock members may be slidably arranged with respect to the fixed body-side.

Figure 2:
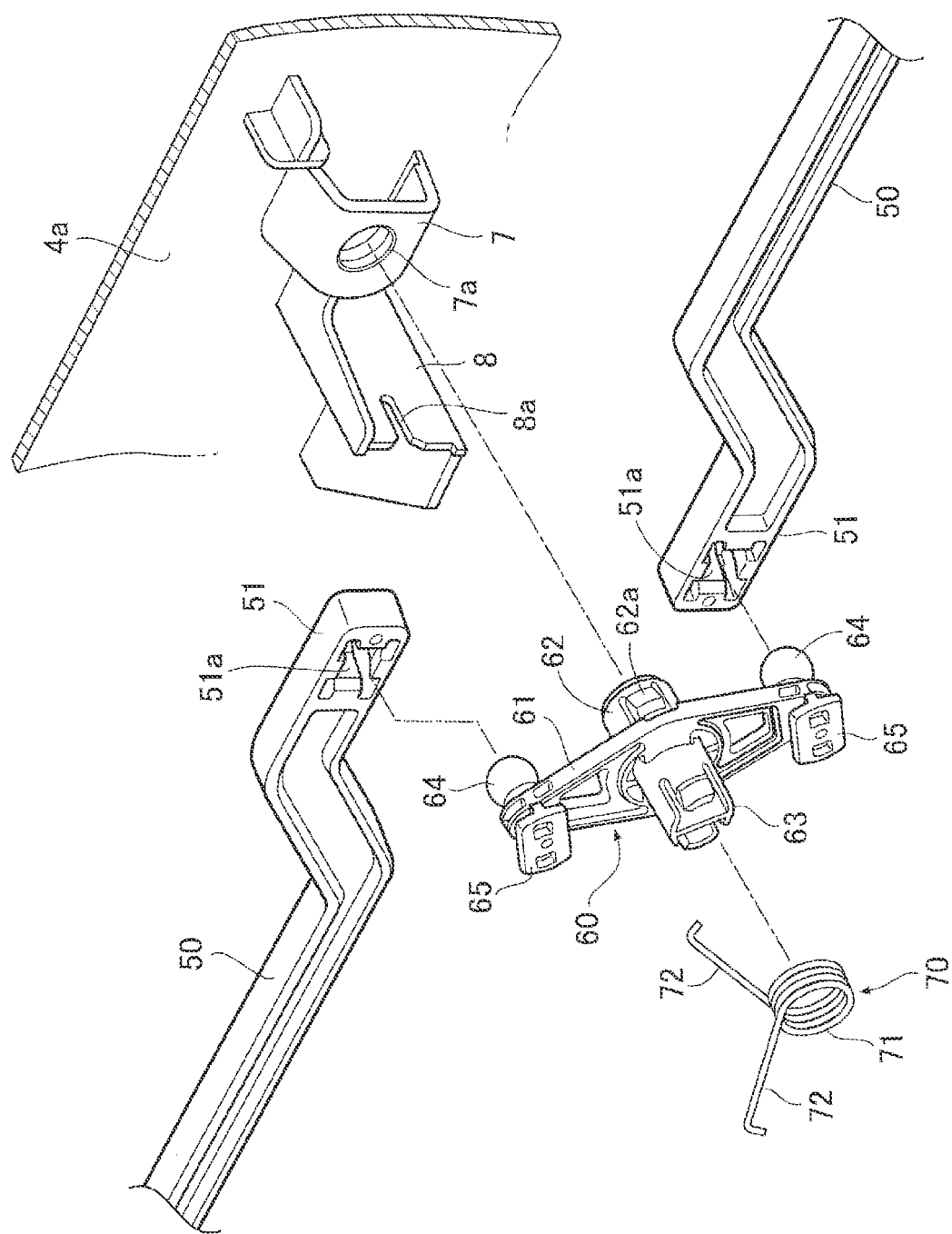
FIG. 2 is an exploded perspective view depicting a state before attaching a rotary member, a lock member and the like in the lock device.

As shown in FIG. 2, in the present embodiment, the first urging means 70 is a torsion spring, and has a wound portion 71 and a pair of arm portions 72 and 72 extending from the wound portion 71. The first urging means 70 is mounted to the rotary member 60 and rotationally urges the same to urge the lock members 50 connected to the rotary member 60 in a direction of engaging with the lock portions 1b (refer to FIG. 18). The first urging means may be, for example, a tension spring that pulls one side of the lock member toward the lock portion and can urge the lock member in a direction of engaging with the lock portion.

Figure 7:
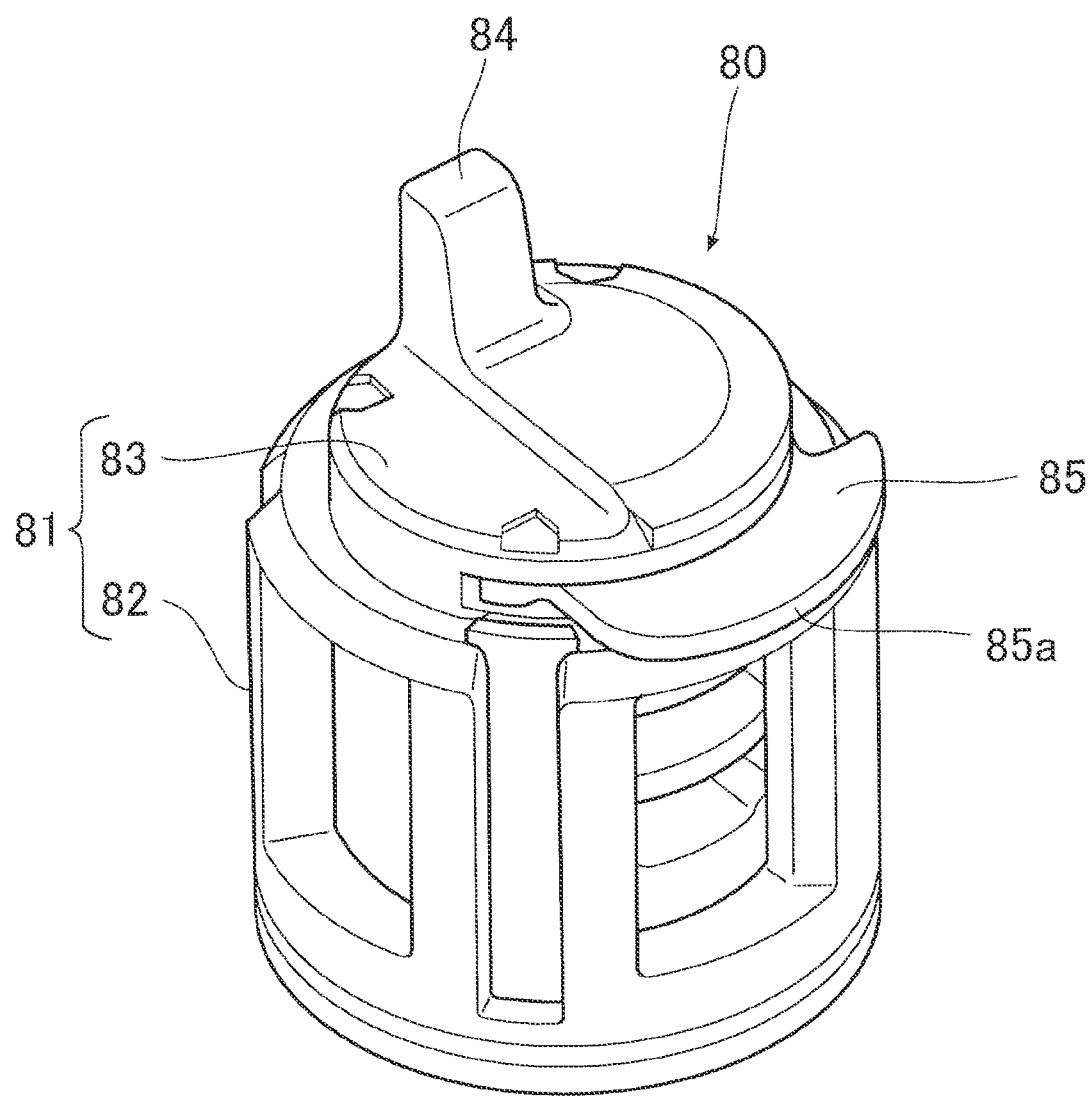
FIG. 7 is an enlarged perspective view of a key cylinder.
Figure 8:
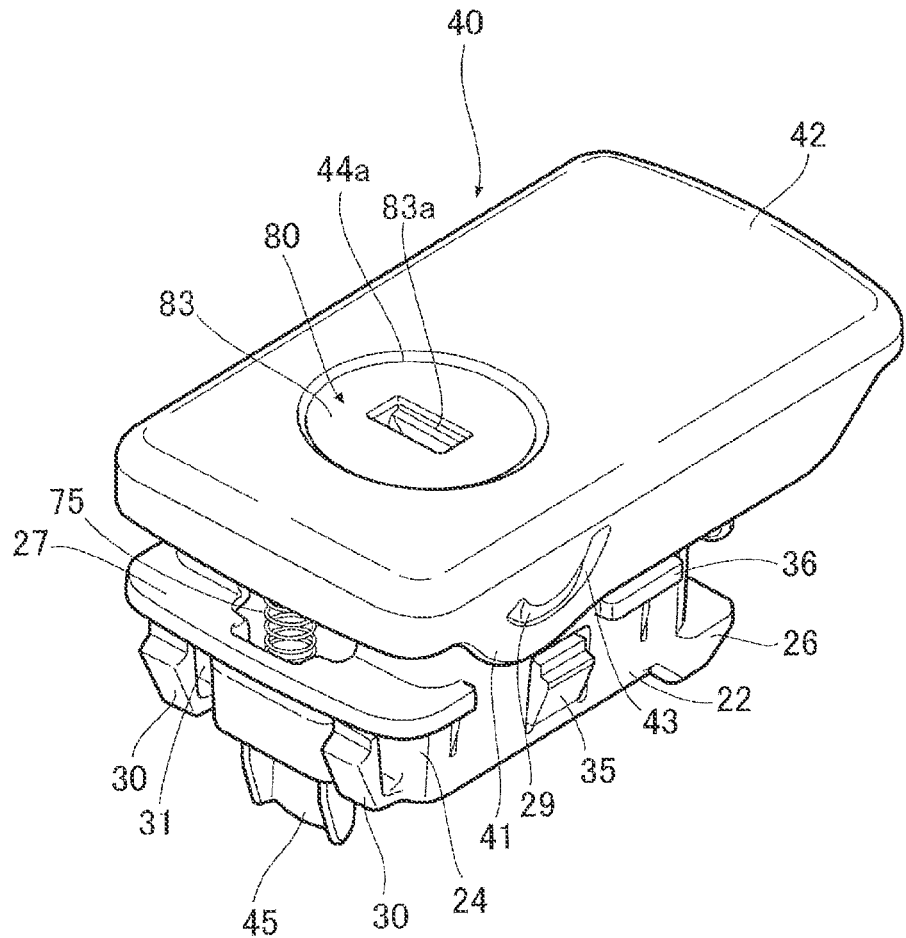
FIG. 8 is an enlarged perspective view depicting a state where the base member, the operation member and the like are attached in the lock device.

In addition, as shown in FIG. 8, a key cylinder 80 is arranged in the operation member 40, so that a locked state of the lock members 50 and 50 to the lock portions 1b and 1b can be kept or released. Referring to FIG. 7, in the present embodiment, the key cylinder 80 has a main body part 81 accommodated in a cylinder accommodation part 44 (FIG. 6; which will be described later) of the operation member 40 and extending in an axial direction of the cylinder accommodation part 44. The main body part 81 is constituted by a substantially cylindrical cover 82 and a rotary body 83 rotatably arranged on an inner periphery of the cover.

A key hole 83a for inserting a key (not shown) is formed from a front surface side of the rotary body 83 (refer to FIG. 4), and a key protrusion 84 integrally protrudes from a rear surface side (backside) of the rotary body 83. For this reason, when the key is inserted in the key hole 83a and the rotary body 83 is rotated, the key protrusion 84 is accordingly rotated.

Figure 11:
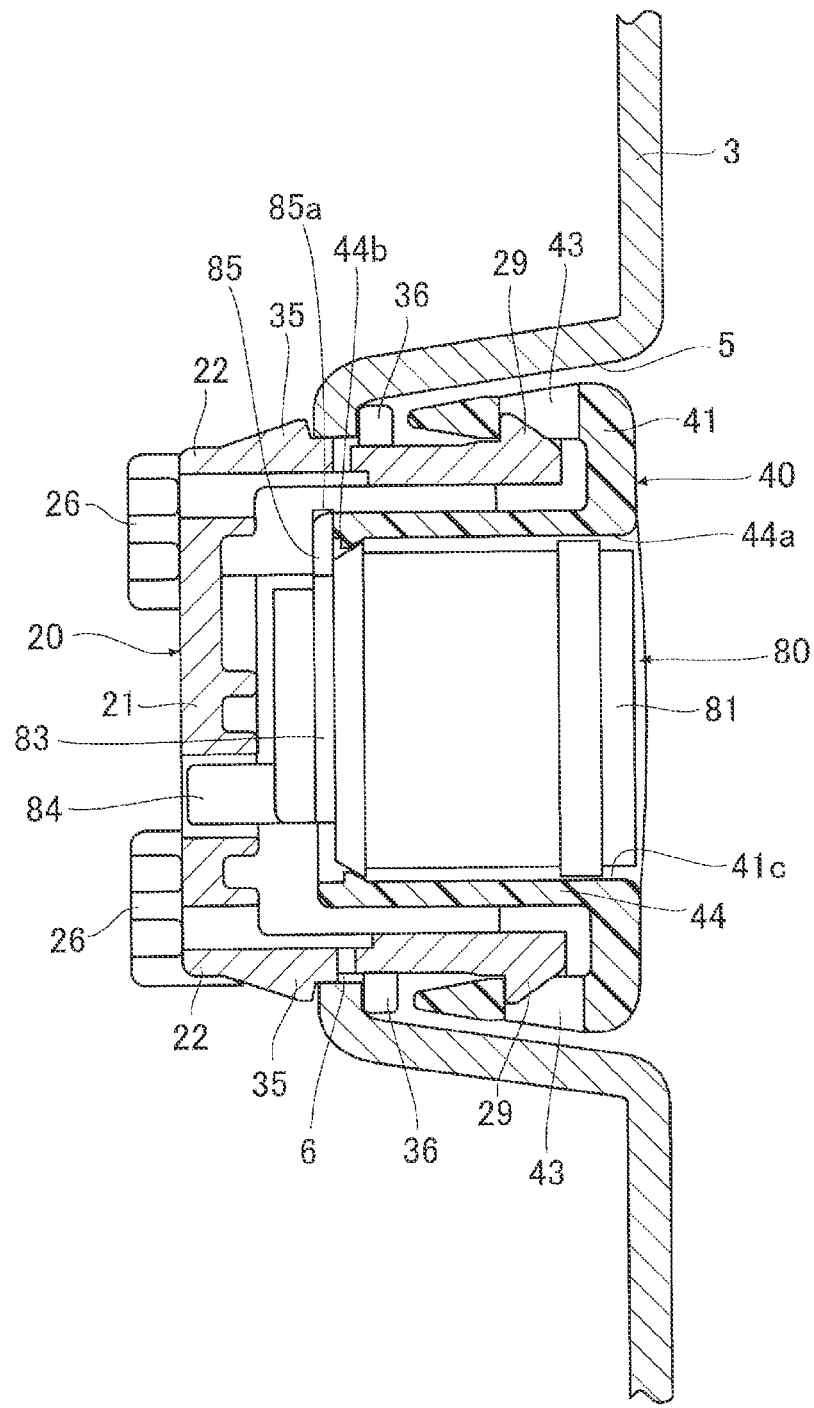
FIG. 11 is a sectional view taken along a B-B arrow of FIG. 9.
Figure 13:
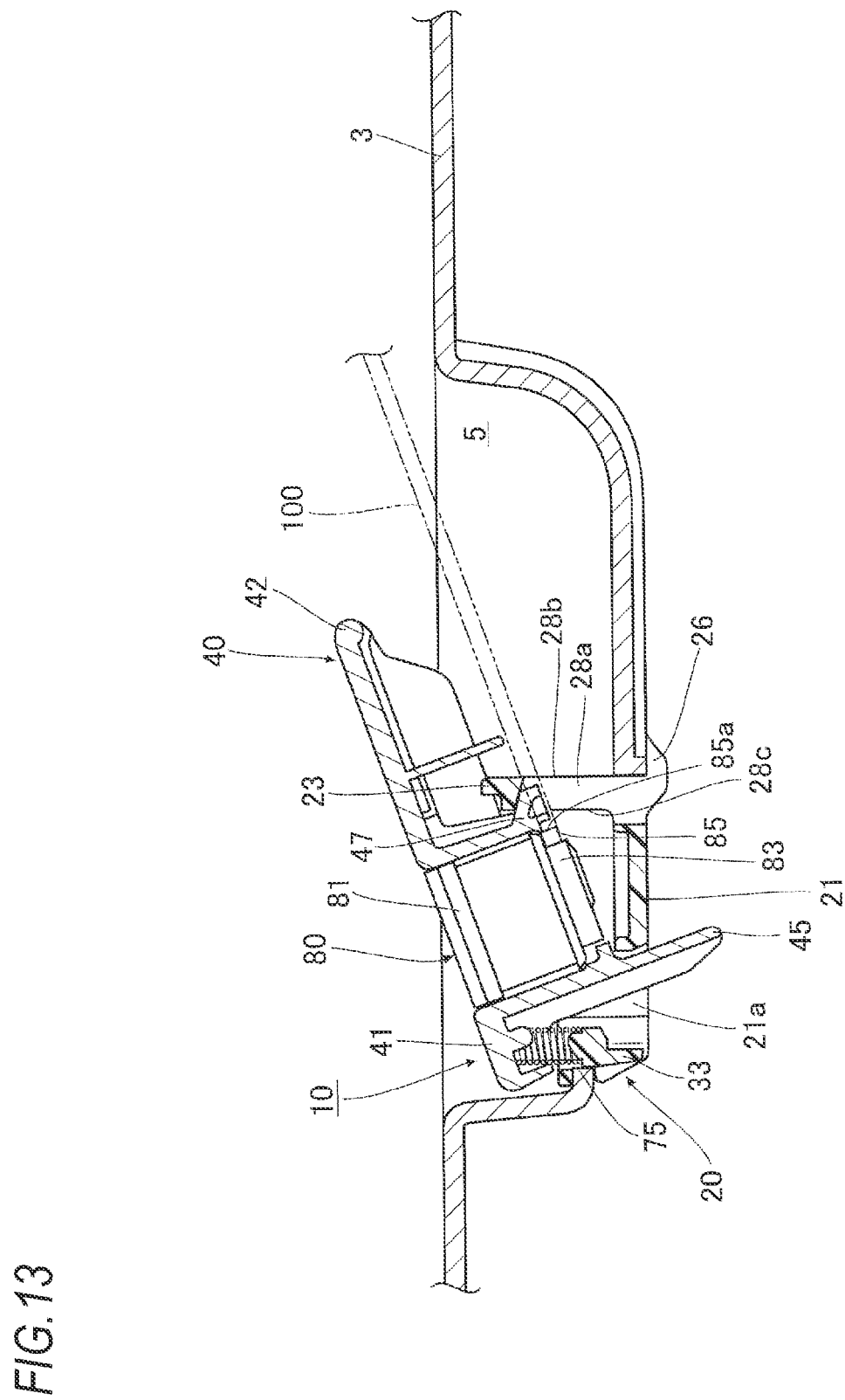
FIG. 13 is a sectional view depicting a rotating state of the operation member in the lock device.
Figure 15:
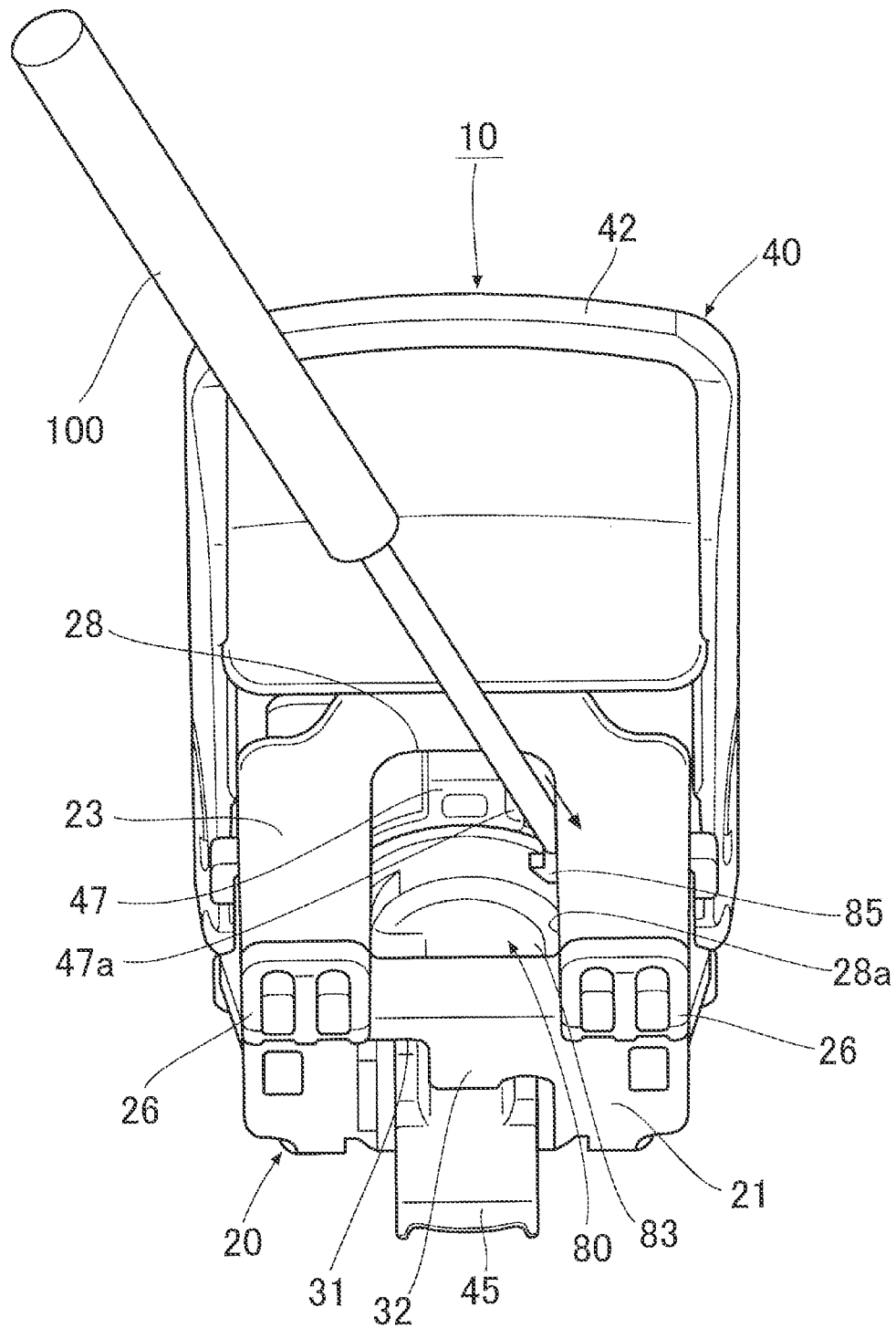
FIG. 15 is a side view of the lock device depicting a removing state of the key cylinder.

A key plate 85 that protrudes and is urged from an outer periphery on a rear surface-side of the rotary body 83 constituting the main body part 81 toward a radially outer direction of the main body part 81 by an urging means (not shown) is provided. As shown in FIG. 11, in a state where the key plate 85 protrudes in the radially outer direction, the key plate 85 is engaged with an opening portion 44b (refer to FIG. 6) on a rear side of the cylinder accommodation part 44, thereby preventing the main body part 81 from coming off. The key plate 85 has a circular arc-shaped outer peripheral surface, and the outer peripheral surface forms a pressing surface 85a that, when pressed by a release tool 100 as shown in FIGS. 13 and 15, enables the key plate 85 to be pressed in a direction of not engaging with the opening portion 44b on the rear side of the cylinder accommodation part 44.

Note that, as described above, the present embodiment is applied to, for example, a structure where the box-shaped glove compartment is rotatably attached to the opening portion of the instrument panel (in this case, the instrument panel is the "fixed body" and the glove compartment is the "opening and closing body") but may also be applied to a structure where a lid is attached to the opening portion of the instrument panel in an openable and closable manner (in this case, the instrument panel is the "fixed body", and the lid is the "opening and closing body") and can also be widely used for a variety of opening and closing bodies for opening and closing the opening portion of the fixed body.

As shown in FIGS. 1 and 16, in the present embodiment, the lock portions 1b and 1b each having a hole shape are provided on both inner surfaces of the opening portion 1a of the fixed body 1 in a width direction. Both side parts of the opening portion 1a of the fixed body 1 are formed with opening and closing body rotation grooves 1c and 1c (refer to FIG. 1). Note that, the lock portion may have a concave shape, a protrusion shape, a frame shape or the like, instead of the hole shape, and may also be provided to the opening and closing body, not the opening portion of the fixed body. That is, the lock portion is not particularly limited.

Figure 9:
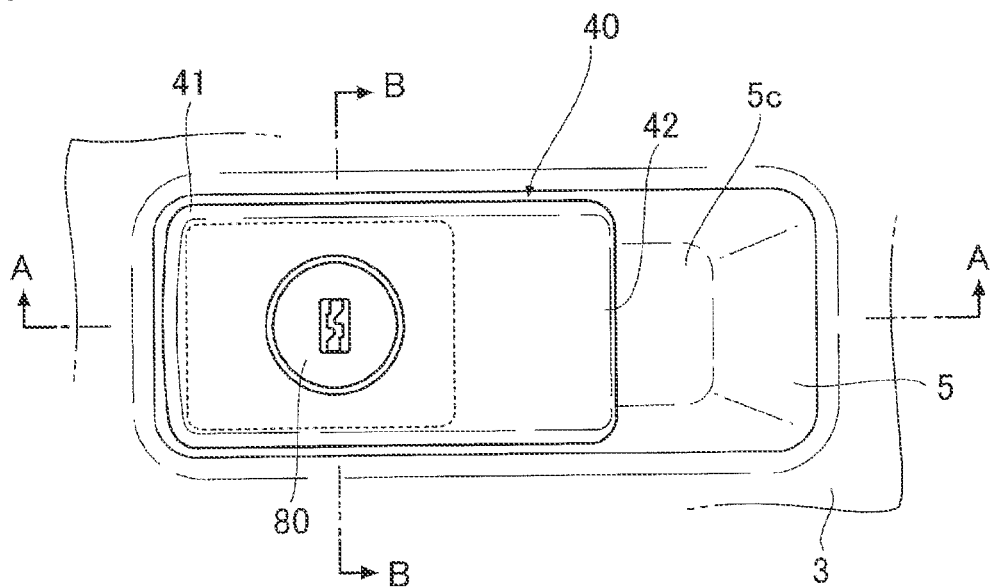
FIG. 9 is a plan view depicting a state where the base member and the operation member are arranged in a concave portion for accommodation.
Figure 10:
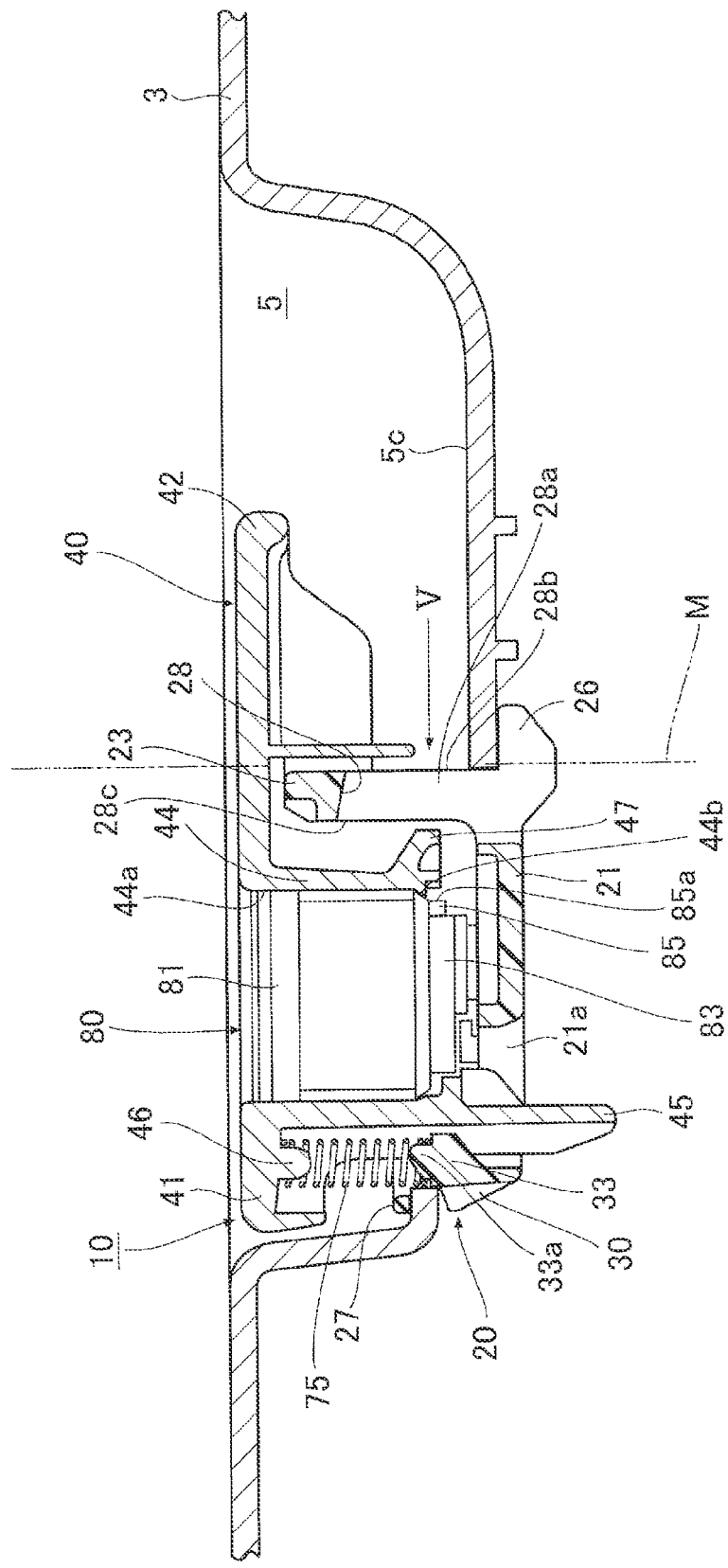
FIG. 10 is a sectional view taken along an A-A arrow of FIG. 9.

As shown in FIG. 1, in the present embodiment, the opening and closing body 2 is constituted by an outer member 3 arranged on a vehicle interior inner side and an inner member 4 arranged on a rear side thereof. Note that, the opening and closing body may also be constituted by one plate, not the two members of the outer member 3 and the inner member 4. A concave portion 5 for accommodation having a horizontally long rectangular shape is formed above one side of the outer member 3 in the width direction. As shown in FIGS. 9 to 11, the operation member 40 is accommodated in the concave portion 5 for accommodation.

One side part of the concave portion 5 for accommodation in a longitudinal direction is formed with an attachment hole 6 having a long hole shape and extending in the width direction of the opening and closing body 2 (refer to FIG. 1). Note that, the attachment hole may not have the long hole shape, and may be a hole having a substantially square shape, a hole having a substantially elliptical shape, a hole having a substantially oval shape, or the like, for example.

The base member 20 is inserted and attached from the front side of the attachment hole 6. As used herein, the "front side" or the "front surface side" means a surface located in a direction in which the opening and closing body is opened from the opening portion of the fixed body such as a vehicle. Note that, in a case where the fixed body is provided in a vehicle, a space side in the vehicle may be the "front side" or the "front surface side". The "rear side" or the "rear surface side" means a surface opposite to the "front side" or the "front surface side", i.e., a surface located in a direction in which the opening and closing body is closed. Note that, the "front side", the "front surface side", the "rear side" and the "rear surface side" have the similar meanings not only for the attachment hole but also for other members (the operation member 40 and the like) to be described later in the present embodiment.

Figure 17:
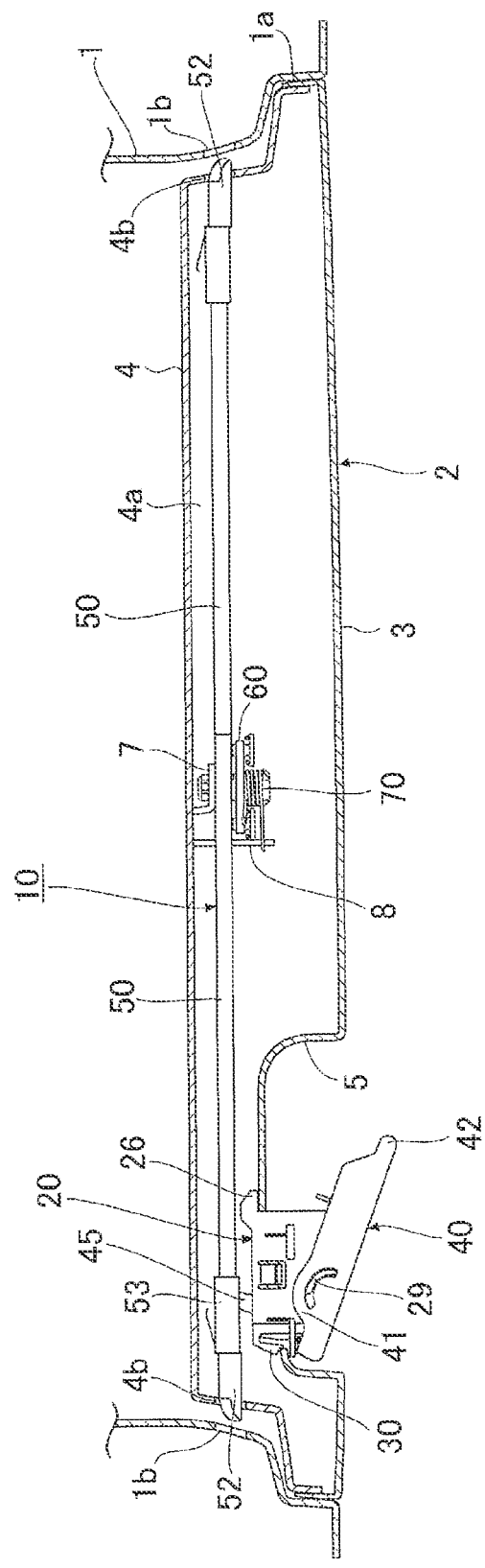
FIG. 17 is a plan view depicting a case where a locked state of the opening and closing body is released in the lock device.

As shown in FIG. 1, the inner member 4 has a box shape that is opened upward, as a whole. An upper part of a front surface side of the inner member 4 arranged to face the outer member 3 is provided with a concave portion 4a for lock arrangement having a horizontally long concave shape and configured to slidably arrange the pair of lock members 50 and 50. As shown in FIGS. 16 and 17, both sides of the concave portion 4a for lock arrangement in the longitudinal direction are each formed with each of holes 4b and 4b for lock insertion and extraction. Also, as shown in FIG. 1, stoppers 4c and 4c protrude from both side outer surfaces of an inner side of the inner member 4. The stoppers 4c and 4c are each inserted in the guide holes 1c and 1c of the fixed body 1, so that an opening/closing angle of the opening and closing body 2 with respect to the opening portion 1a of the fixed body 1 is regulated.

Figure 3:
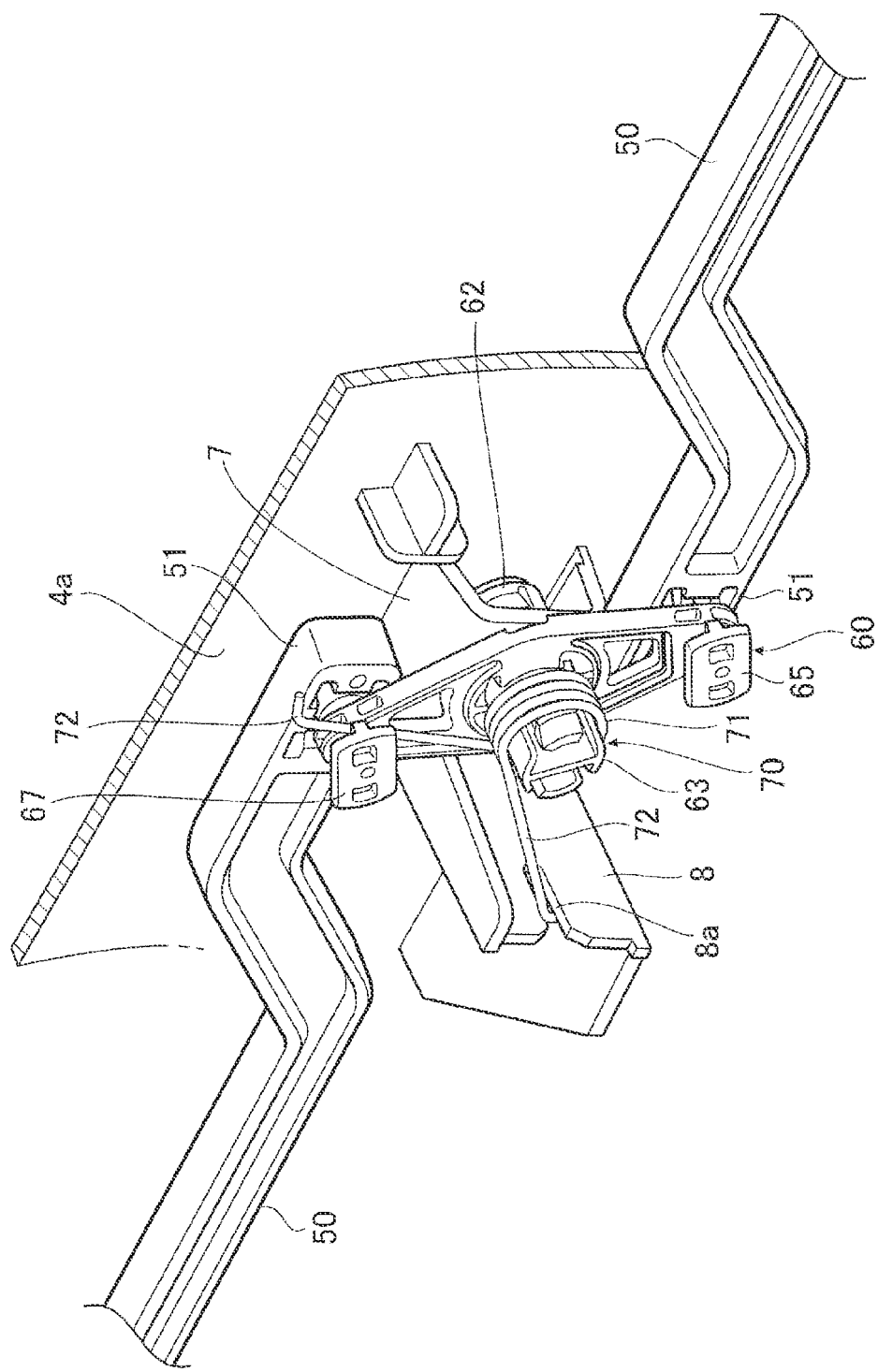
FIG. 3 is an enlarged perspective view depicting a state where the rotary member, the lock member and the like are attached in the lock device.

As shown in FIGS. 16 and 17, a rotary member support part 7 for rotationally supporting the rotary member 60 protrudes from a front surface side of a bottom surface of the concave portion 4a for lock arrangement. Referring to FIGS. 2 and 3, the rotary member support part 7 has a dog house-like box shape where a front surface side is opened, and a ceiling surface thereof is formed with a support hole 7a having a circular hole shape. A spring engaging wall 8 is erected at a position close to the rotary member support part 7. The spring engaging wall 8 is formed with an engaging groove 8a, and one arm portion 72 of the first urging means 70 is engaged with the engaging groove 8a.

Also, as shown in FIGS. 1 and 2, the pair of lock members 50 and 50 of the present embodiment has the same shape where a base end portion 51-side is bent in a crank shape and extends linearly toward a tip end-side and a tip end portion 52 is adapted to engage with or disengage from the lock portion 1b (refer to FIGS. 16 to 19). Note that, as shown in FIG. 2, the base end portion 51 of the lock member 50 is provided with a concave portion 51a for fitting having a concave shape and a lock connecting portion 64 of the rotary member 60, which will be described later, is fitted in the concave portion 51a for fitting. A tip end-side of the lock member 50 is provided with a frame-shaped part 53 having a rectangular frame shape.

As shown in FIG. 2, the rotary member 60 has a main body 61 having a substantially rhombic shape, a substantially tubular rotation support portion 62 protruding from a center on a rear side of the main body 61, a substantially tubular spring mounting portion 63 protruding from a center on a front side of the main body 61, spherical lock connecting portions 64 and 64 protruding from both ends in the longitudinal direction on a rear side of the main body 61, and spring engaging pieces 65 and 65 protruding from both ends in the longitudinal direction on a front side of the main body 61. Flexible engaging pieces 62a and 62a are formed via slits on an outer periphery of the rotation support portion 62.

Each lock connecting portion 64 is fitted and connected in the concave portion 51a for fitting provided to the base end portion 51 of each lock member 50, so that the base end portions 51 of the pair of lock members 50 and 50 are rotatably connected to both end portions of the rotary member 60 in the longitudinal direction. The rotation support portion 62 is inserted into the support hole 7a of the rotary member support part 7, so that the engaging pieces 62a and 62a are engaged with a peripheral edge on a rear side of the support hole 7a and the rotary member 60 is thus rotatably supported to the rotation support portion 62 and is prevented from coming off from the rotation support portion 62 (refer to FIG. 3). The rotary member 60 is rotated in a predetermined direction, so that the pair of lock members 50 and 50 is slid in a synchronization manner via the rotary member 60.

The spring mounting portion 63 is inserted into the wound portion 71 of the first urging means 70, so that the first urging means 70 is mounted to the rotary member 60. Then, the other arm portion 72 of the first urging means 70 is engaged with one spring engaging piece 65, so that the rotary member 60 is rotationally urged, as shown with a direction of an arrow E1 in FIG. 18. Thereby, the tip end portions 52 and 52 of the pair of lock members 50 and 50 are urged in a direction of engaging with the pair of lock portions 1b and 1b (a direction of an arrow E2 in FIG. 18). Note that, as described above, the pair of lock members 50 and 50 is slidably arranged in the concave portion 4a for lock arrangement of the inner member 4 constituting the opening and closing body 2. However, the tip end portions 52 and 52 are inserted from the holes 4b and 4b for lock insertion and extraction provided to the concave portion 4a for lock arrangement.

In the present embodiment, as shown in FIGS. 2 and 3, the base member 20 that is inserted and attached from the front side of the attachment hole 6 has a substantially elongated box shape having a bottom wall 21 having an elongated plate shape that is long in one direction, a pair of sidewalls 22 and 22 erected from peripheral edges of both sides along long sides of the bottom wall 21, a wall part 23 arranged on one end-side of the bottom wall 21 in the longitudinal direction and connecting the pair of sidewalls 22 and 22 each other, and a wall part 24 arranged on the other end-side of the bottom wall 21 in the longitudinal direction and connecting the pair of sidewalls 22 and 22 each other, where an upper side opposite to the bottom wall 21 is opened and a cylinder arranging space 25 is defined therein. In the cylinder arranging space 25, a cylinder accommodation part 44 (which will be described later; refer to FIG. 6) of the operation member 40 is arranged.

Note that, one end of the bottom wall 21 in the longitudinal direction is arranged in the same direction as one end of the attachment hole 6 in the longitudinal direction, and the other end of the bottom wall 21 in the longitudinal direction is arranged in the same direction as the other end of the attachment hole 6 in the longitudinal direction.

Figure 14:
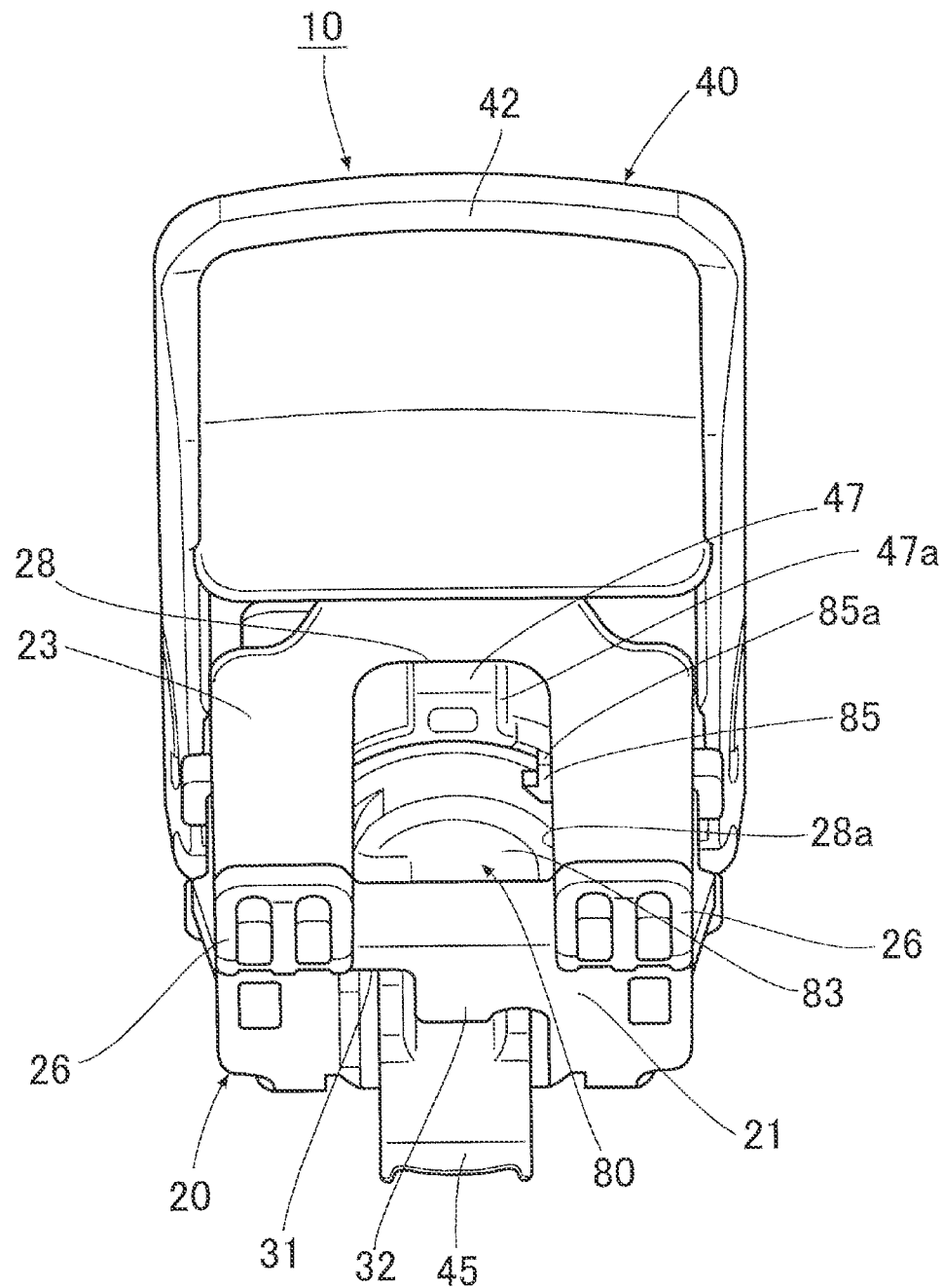
FIG. 14 is a side view of the lock device in the released state of the key lock.

The wall part 23 is located on a tip end-side of the operation member 40 (i.e., located on the gripping part 42-side to be described later) and forms the "wall part" of the present invention. Note that, the wall part 24 is located on the base end portion 41-side of the operation member 40. The wall part 23 is formed with an opening 28 configured to communicate with the cylinder arranging space 25. In the present embodiment, as shown in FIG. 14, the wall part 23 has a substantially U-shaped frame shape erected from the bottom wall 21, and an inner side part thereof is provided with the opening 28 having a substantially long hole shape.

As shown in FIG. 13, the opening 28 is configured to engage with a convex portion 47 (which will be described later) of the operation member 40 and to regulate a rotating angle of the operation member 40, and is provided so that the release tool 100 for releasing an engaged state of the opening portion 44b on the rear side of the cylinder accommodation part 44 and the key plate 85 is inserted into the cylinder arranging space 25 from an outside of the base member. Note that, the opening may have, for example, a substantially elliptical hole shape, a substantially oval hole shape or the like, and may have any shape as long as it is possible to achieve the above objects (the rotation regulation on the operation member and the insertion of the release tool).

Figure 5A:
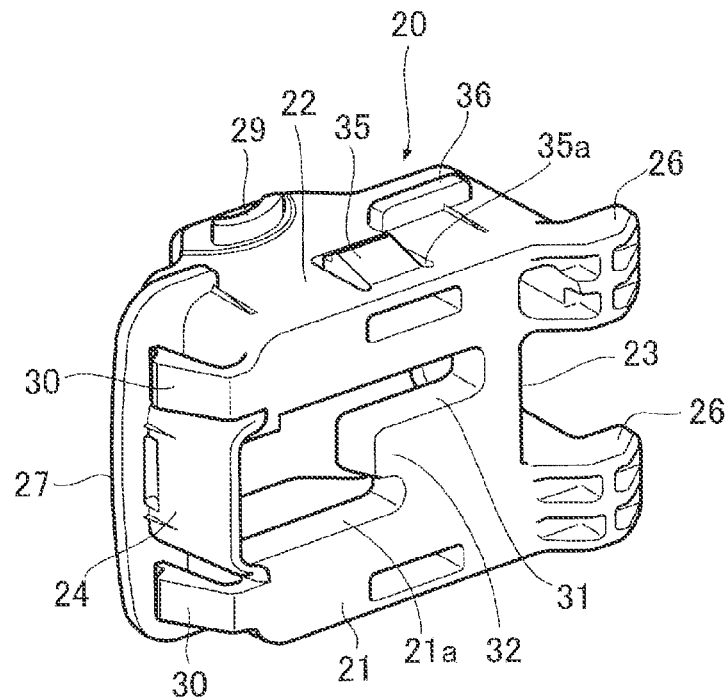
FIG. 5A is an enlarged perspective view of the base member.

A slide groove 21a configured to slidably accommodate an operating lever 45 (which will be described later) of the operation member 40 is formed to communicate with the cylinder arranging space 25 on the other end-side of the bottom wall 21 in the longitudinal direction. As shown in FIGS. 5 and 12, in the bottom wall 21, a thin groove-shaped key groove 31 extends from one side of the slide groove 21a in the width direction toward one end-side of the bottom wall 21 in the longitudinal direction, and the other end-side of the key groove 31 in the longitudinal direction is provided with a key contact portion 32 having a protruding piece shape. Note that, the key groove 31 is configured to communicate with the slide groove 21a.

A pair of hooks 26 and 26 configured to engage with a rear peripheral edge of one end of the attachment hole 6 in the longitudinal direction protrudes from both sides on the bottom wall 21-side of the wall part 23 in the width direction (a direction orthogonal to the longitudinal direction). A thin flange-shaped wall part 27 arranged to face the other end-side of the attachment hole 6 protrudes from a predetermined height position of an outer periphery of the wall part 24 of the base member 20 toward an outside of the base member. A rotation support portion 29 having a substantially circular arc protrusion shape and configured to rotationally support the base end portion 41 of the operation member 40 protrudes from an outer surface above each of the pair of sidewalls 22 and 22 and close to the wall part 24. Both sides of the wall part 24 in the width direction are provided with a pair of elastically deformable elastic engaging claws 30 and 30 configured to engage with the rear peripheral edge of the attachment hole 6.

Figure 5B:
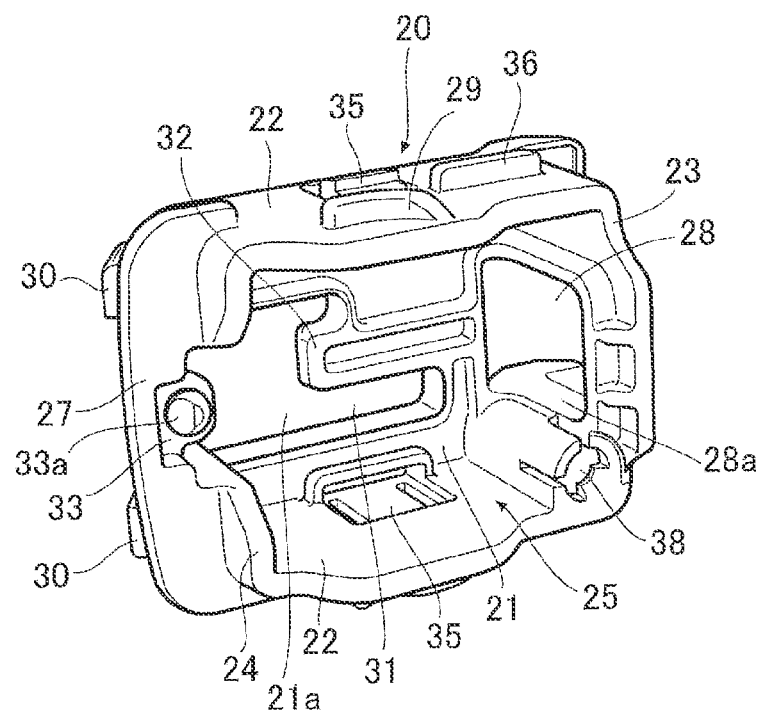
FIG. 5B is an enlarged perspective view of the base member, as seen in a direction different from FIG. 5A.

As shown in FIG. 5B, a spring support portion 33 is provided at a center of the wall part 24-side in the width direction. A spring support protrusion 33a for supporting the other end of a second urging means 75 protrudes from a surface (a surface facing the operation member 40) of the spring support portion 33.

As shown in FIG. 10, the other end of the second urging means 75 is supported by the spring support protrusion 33a on the base member 20-side and one end of the second urging means 75 is supported by a spring support protrusion 46 (which will be described later) of the operation member 40, so that the second urging means is kept compressed between both the members and the base end portion 41-side of the operation member 40 is rotationally urged in a direction of separating from the base member 20. For this reason, as shown with the dashed-two dotted line in FIG. 13, when the gripping part 42 of the operation member 40 is rotated in a direction of separating from the base member 20 and a hand is then detached from the gripping part 42, the gripping part 42 is urged toward the base member 20 and is held not to protrude from the concave portion 5 for accommodation.

As shown in FIG. 5, flexible elastic engaging pieces 35 and 35 are formed via U-shaped slits 35a on the further wall part 23-side than the rotation support portions 29 and 29 on outer surfaces of the sidewalk 22 and 22 of the base member 20. In addition, ribs 36 and 36 protrude at positions close to the elastic engaging pieces 35 and 35 on the outer surfaces of the sidewalls 22 and 22 close to the wall part 23. The pair of elastic engaging pieces 35 and 35 is engaged with the rear peripheral edges of both side parts of the attachment hole 6 in the longitudinal direction, and the pair of ribs 36 and 36 is engaged with the front peripheral edges of both side parts of the attachment hole 6 (refer to FIG. 11).

Figure 4:
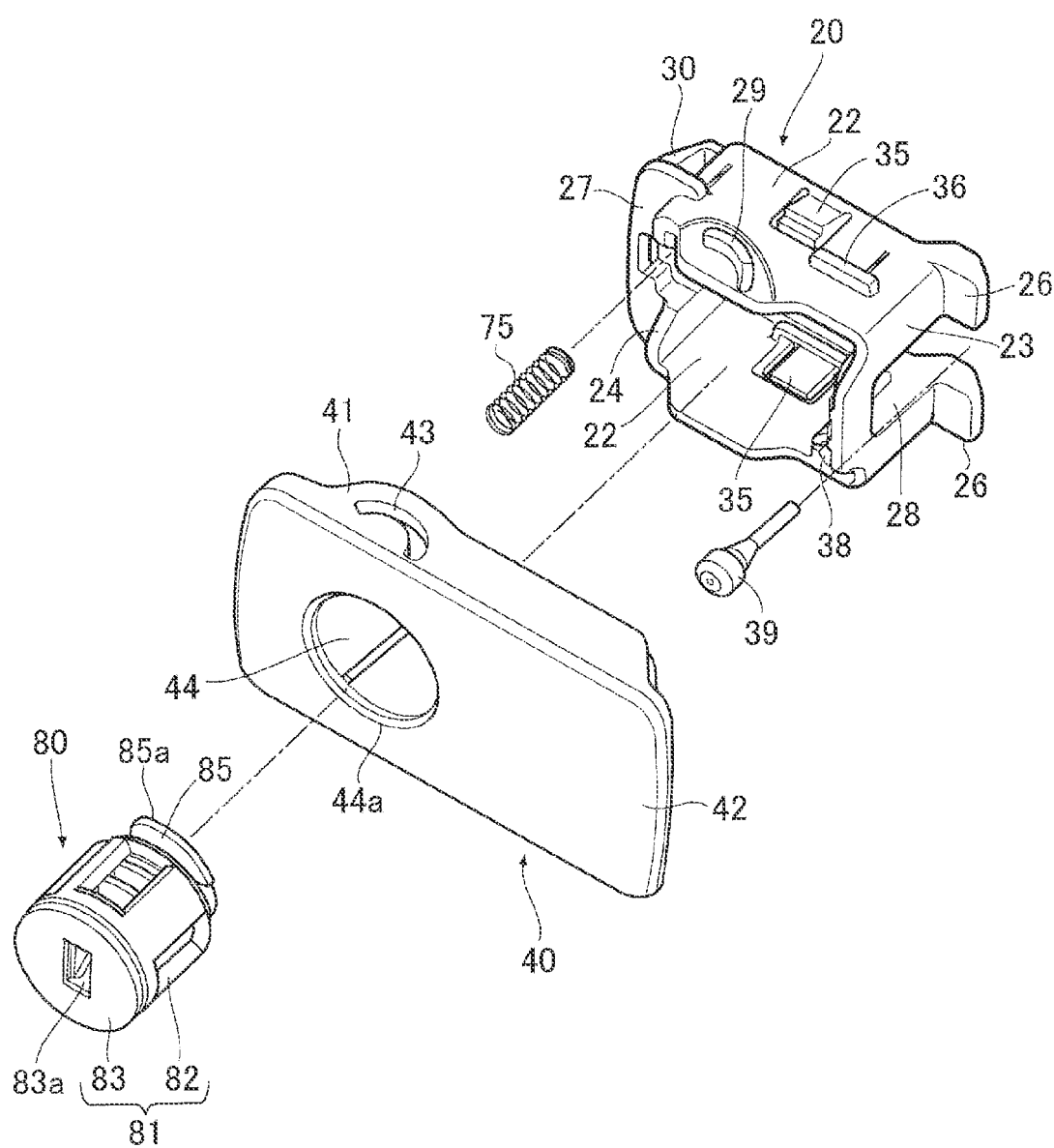
FIG. 4 is an exploded perspective view depicting a state before attaching a base member, an operation member and the like in the lock device.

As shown in FIG. 5B, a damper mounting hole 38 is formed at a corner portion on one end-side of the base member 20. As shown in FIG. 4, a rubber damper 39 is mounted to the damper mounting hole 38, so that a hitting sound is reduced when the operation member 40 rotates.

Figure 6:
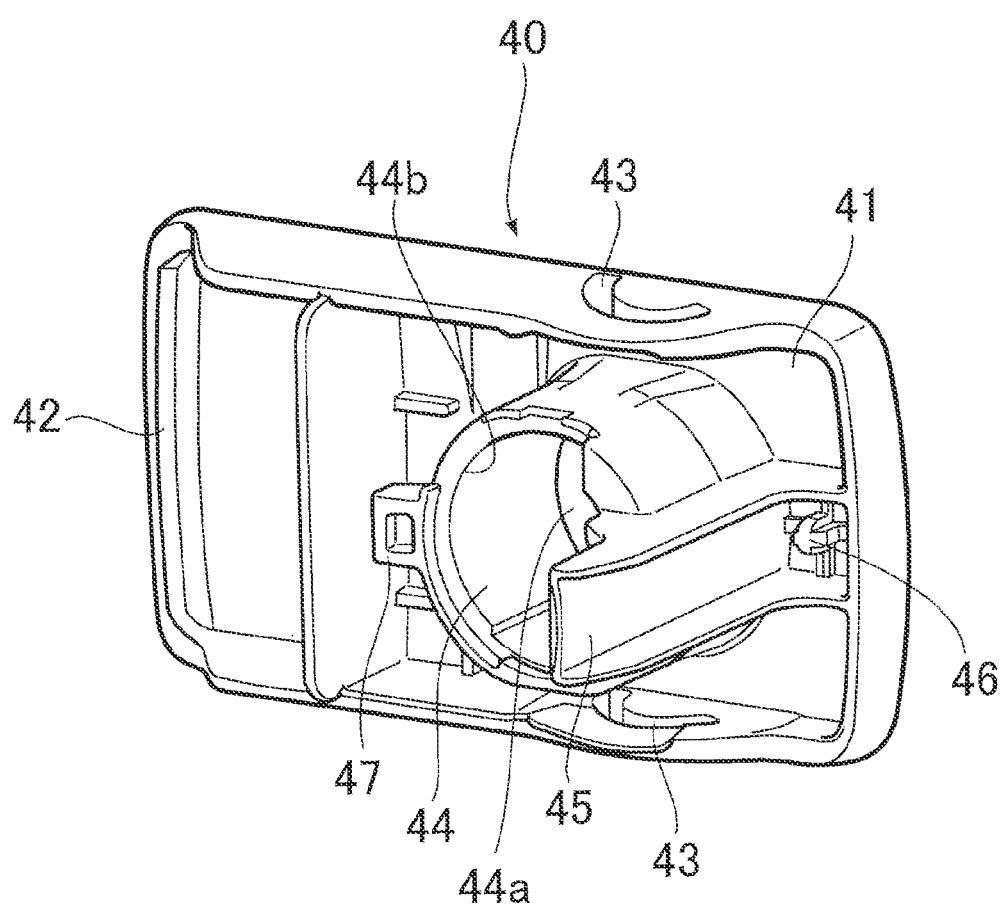
FIG. 6 is an enlarged perspective view of the operation member.

In the present embodiment, as shown in FIGS. 6 and 8, the operation member 40 that is rotatably attached to the base member 20 via the rotation support portions 29 and 29 has an elongated shape that is long in one direction as a whole. The operation member 40 has the base end portion 41 that is rotatably supported to the rotation support portions 29 of the base member 20, and a gripping part 42 that is provided at a tip end portion in the longitudinal direction and is gripped by an operator when rotationally operating the operation member 40. Both sides (both sides in the width direction orthogonal to the longitudinal direction) of the base end portion 41 are formed with groove portions 43 and 43 each having a substantially circular arc groove shape. The circular arc protrusion-shaped rotation support portions 29 and 29 of the base member 20 are each inserted into the groove portions 43 and 43, so that the base end portion 41 of the operation member 40 is rotatably supported via the rotation support portions 29.

As shown in FIG. 13, the operation member 40 is configured so that the gripping part 42 on the tip end portion-side can be rotated away from or toward the base member 20 about the base end portion 41 as a support point rotationally supported to the rotation support portions 29 of the base member 20.

As shown in FIG. 6, a cylindrical cylinder accommodation part 44 protrudes at a position close to the base end portion 41 of the operation member 40 and from a rear surface side thereof. As shown in FIG. 4, a surface of the cylinder accommodation part 44 toward the operation member 40 is provided with a circular opening portion 44a on a front side, and the key cylinder 80 can be inserted from the opening portion 44a on the front side. A tip end-side of the cylinder accommodation part 44 in a protruding direction is also provided with a circular opening portion 44b on a rear side, and the key plate 85 can be engaged with or disengaged from the opening portion on the rear side.

When accommodating and retaining the key cylinder 80 in the cylinder accommodation part 44, the key plate 85 is pushed against an urging force of an urging means (not shown) and the key cylinder 80 is then inserted into the cylinder accommodation part 44 from the key protrusion 84-side through the opening portion 44a on the front side. Then, when the main body part 81 is accommodated in the cylinder accommodation part 44 and the key plate 85 comes off from the opening portion 44b on the rear side of the cylinder accommodation part 44, the key plate 85 protrudes and is urged in the radially outer direction, so that the key plate 85 is engaged with the opening portion 44b on the rear side of the cylinder accommodation part 44, as shown in FIG. 11. Therefore, the key cylinder 80 can be accommodated in the cylinder accommodation part 44 in a retaining state. Note that, in the state where the key cylinder 80 is accommodated in the cylinder accommodation part 44, the key protrusion 84 is arranged to be movable between the key groove 31 and the key contact portion 32 of the base member 20 (refer to FIG. 12).

Figure 18:
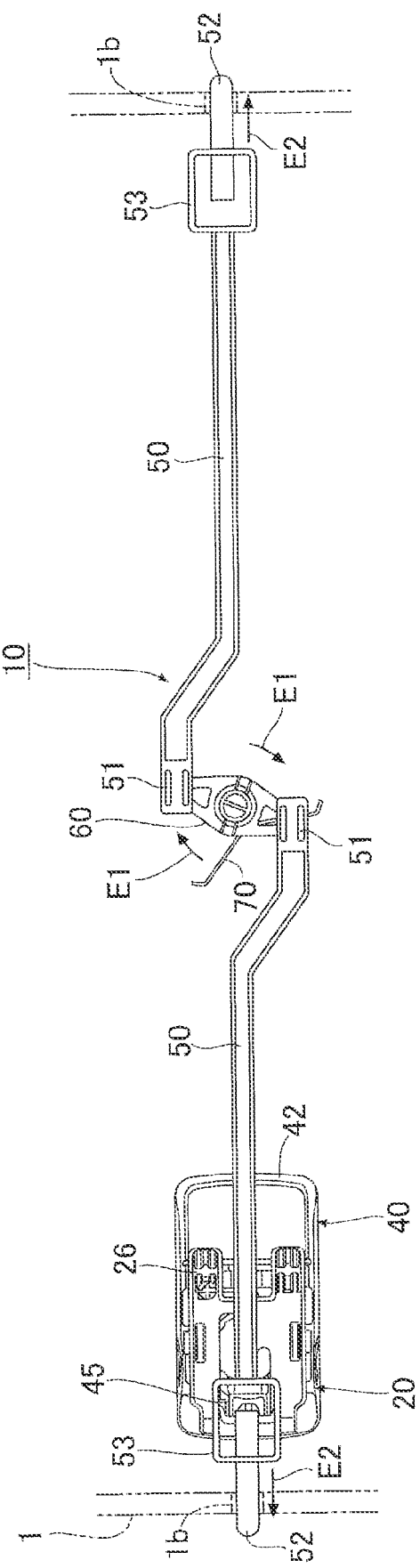
FIG. 18 is a front view depicting the case where the opening and closing body is locked in the closed state in the lock device.

As shown in FIG. 6, an operating lever 45 that causes the tip end portion 52 of the lock member 50 to slide in a direction of not engaging with the lock portion 1b of the fixed body 1 when the gripping part 42 of the operation member 40 rotates in a direction of separating from the base member 20 protrudes from a position close to the cylinder accommodation part 44 on the rear surface of the base end portion 41-side of the operation member 40. The operating lever 45 has a substantially U-shaped frame shape in a cross section and extends by a predetermined length. Note that, the operating lever 45 is inserted in the cylinder arranging space 25 of the base member 20 and is inserted into the slide groove 21a formed in the bottom wall 21, so that it can slide in the slide groove 21a along the longitudinal direction of the base member 20. A tip end portion of the operating lever 45 in the extension direction is inserted from the slide groove 21a and enters the frame-shaped part 53 of one lock member 50, as shown in FIG. 18.

As shown in FIGS. 13 and 17, when the gripping part 42 of the operation member 40 is rotated in a direction of separating from the base member 20, the operating lever 45 presses an inner surface of the frame-shaped part 53 of one lock member 50, thereby pulling the tip end portion 52 of one lock member 50 in a direction of not engaging with the lock portion 1b against the urging force of the first urging means 70 and pulling the tip end portion 52 of the other lock member 50 in a direction of not engaging with the lock portion 1b via the rotary member 60 in association (synchronization) with the pulling. Thereby, the locked state of the opening and closing body 2 that closes the opening portion 1a of the fixed body 1 can be released.

Note that, in the present embodiment, when the operation member 40 is rotationally operated as described above, one lock member 50 is slid and the other lock member 50 is slid via the rotary member 60. However, the rotary member 60 may be rotated by the rotation operation of the operation member 40, thereby sliding the lock member 50.

In the lock device 10, as described above, the gripping part 42 of the operation member 40 can be rotated away from or toward the base member 20. However, the rotating operation of the operation member 40 is regulated by an operation of the key cylinder 80.

Figure 12A:
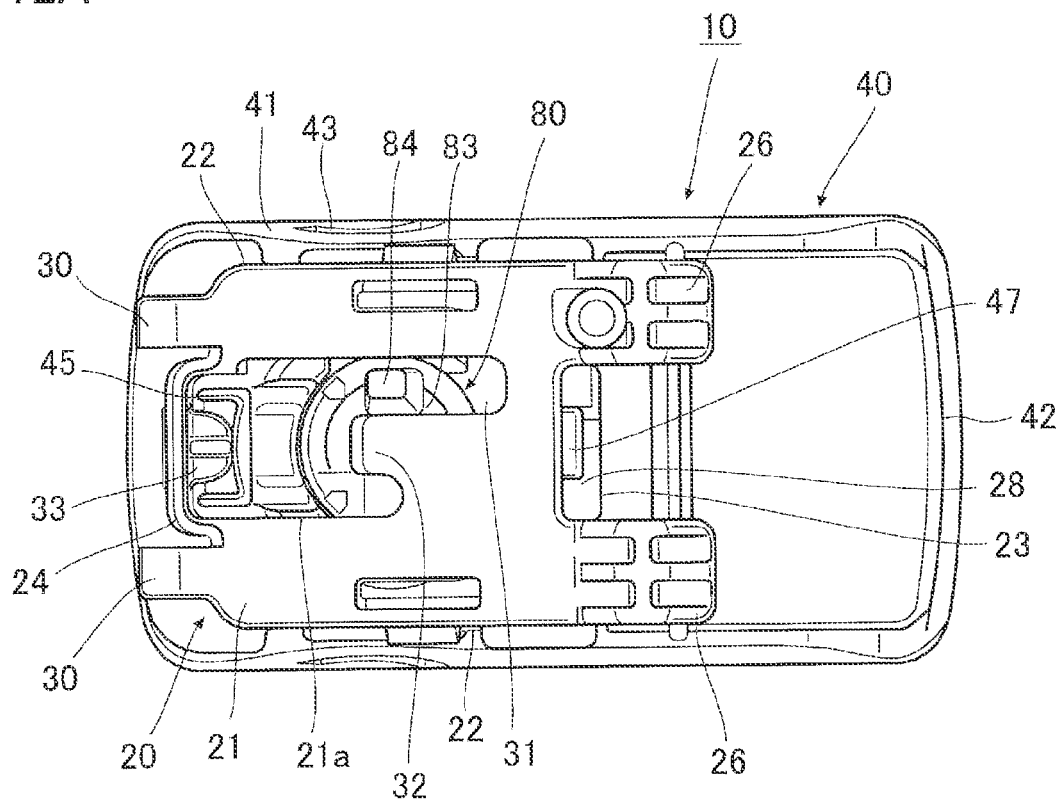
FIGS. 12A and 12B are bottom views of the lock device, where

That is, as shown in FIG. 12A, in a state where the key protrusion 84 is located in the key groove 31 of the base member 20, the operation member 40 can be rotated in the direction of separating the gripping part 42 from the base member 20 (a free rotation state of the operation member 40). As a result, the tip end portion 52 of one lock member 50 can be slid via the operating lever 45 in a direction of not engaging with the lock portion 1b, so that a locked state of the lock member 50 to the lock portion 1b can be released.

Figure 12B:
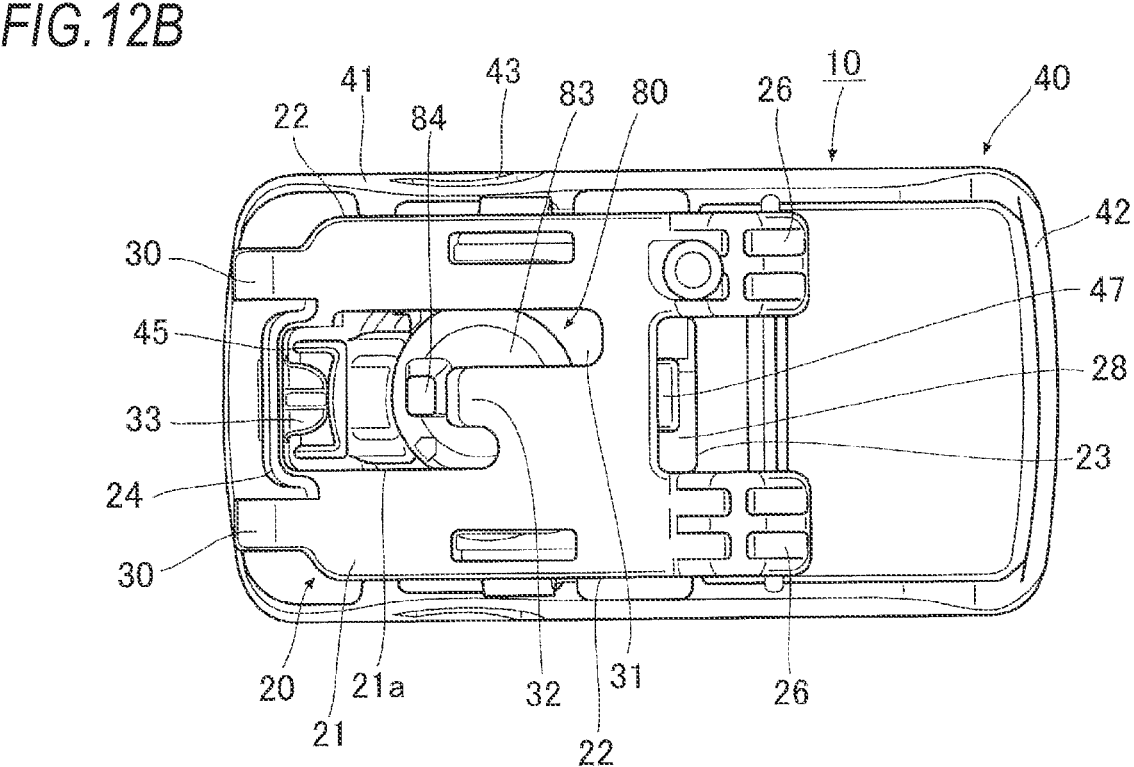

On the other hand in a state where the rotary body 83 is rotated to cause the key protrusion 84 to come close to the key contact portion 32 of the base member 20, as shown in FIG. 12B, even though it is intended to rotate the operation member 40 in the direction of separating the gripping part 42 from the base member 20, the key protrusion 84 is in contact with the key contact portion 32, so that the rotation of the operation member 40 is regulated (a rotation regulated state of the operation member 40). As a result, any of the lock members 50 cannot be slidingly operated, so that a locked state of the lock member 50 to the lock portion 1b is kept.

As shown in FIG. 6, a spring support protrusion 46 for supporting one end of the second urging means 75 that is a coil spring protrudes from the furthest base end of the rear surface side of the base end portion 41 of the operation member 40.

Also, as shown in FIG. 6, a convex portion 47 protrudes from an opening peripheral edge portion of the cylinder accommodation part 44 of the operation member 40 on an opposite side to the operating lever 45. As shown in FIG. 13, when the gripping part 42 of the operation member 40 is rotated in a direction of separating from the base member 20, the convex portion 47 is engaged with an inner side 28a (which means a side facing toward an inside of the base member in a direction orthogonal to an opening direction of the opening 28) of the opening 28 provided to the wall part 23 of the base member 20, thereby regulating a rotating angle of the gripping part.

As described above, the cylinder accommodation part 44 configured to accommodate and hold the key cylinder 80 is arranged in the cylinder arranging space 25 of the base member 20. Further, in the lock device 10, as shown in FIG. 10, the pressing surface 85a (a part configured to be pressed against an urging force of the key plate 85 to thus enable the key plate to be pushed in a direction of not engaging with the opening portion 44b on the rear side of the cylinder accommodation part 44) of the key plate 85 of the key cylinder 80 accommodated in the cylinder accommodation part 44 is exposed into the cylinder arranging space 25 of the base member 20 and is arranged on the further base end portion 41-side of the operation member 40 than an edge portion of the opening 28 formed in the wall part 23 (it can be said that the pressing surface 85a is arranged at a position further retracted into the cylinder arranging space 25 than the edge portion of opening 28).

That is, as shown in FIG. 10, the opening 28 has an outer edge portion 28b located on an outer side of the wall part 23 in a plate thickness direction (the gripping part 42-side of the operation member 40) and an inner edge portion 28c located on an inner side of the wall part 23 in the plate thickness direction (the base end portion 41-side of the operation member 40). However, the pressing surface 85a of the key plate 85 is arranged on the further base end portion 41-side of the operation member 40 than any of the edge portions 28b and 28c. In this way, since the pressing surface 85a of the key plate 85 is arranged on the further base end portion 41-side of the operation member 40 than the edge portions of the opening 28, when inserting the release tool 100 toward the cylinder arranging space 25 from an outside of the opening 28, the release tool can be guided by any one of the inner side 28a, the outer edge portion 28b and the inner edge portion 28c of the opening 28. Also, in the present embodiment, as shown in FIG. 10, the pressing surface 85a of the outer periphery of the key plate 85 is arranged toward the opening 28 of the base member 20.

In a state where the locked state of the lock member 50 to the lock portion 1b is released by the key cylinder 80 and the operation member 40 is rotated in the direction of separating the gripping part 42 from the base member 20, the key plate 85 is located at a position at which it can be pushed through the opening 28 by the release tool 100. Specifically, as shown in FIG. 12A, in a state where the key protrusion 84 is located in the key groove 31 of the base member 20, the locked state of the lock member 50 to the lock portion 1b is released by the key cylinder 80 and the operation member 40 is rotated in the direction of separating the gripping part 42 from the base member 20 upon release of the key lock, as shown in FIG. 13, the key plate 85 is arranged to be a position at which it can be pushed through the opening 28 formed in the wall part 23 by the release tool 100.

Also, as shown in FIG. 14, in the state where the locked state of the lock member 50 to the lock portion 1b is released by the key cylinder 80 and the operation member 40 is rotated in the direction of separating the gripping part 42 from the base member 20, the pressing surface 85a of the key plate 85 can be visually recognized through the opening 28 from an outside of the base member 20.

Also, in the state where the locked state of the lock member 50 to the lock portion 1b is released by the key cylinder 80 and the operation member 40 is rotated in the direction of separating the gripping part 42 from the base member 20, a part of the pressing surface 85a of the key plate 85 is located on the inner side 28a of the opening 28, when the opening 28 is seen from an outside of the base member 20 and a direction orthogonal to a plane direction of the wall part 23 (as shown in FIG. 10, a direction V orthogonal to the plane direction M of the wall part 23), as shown in FIG. 14.

In the present embodiment, as described above, the operation member 40 is provided with the convex portion 47 that is engaged with the inner side 28a of the opening 28 to regulate a rotating angle of the operation member 40 when the operation member is rotated in the direction of separating the gripping part 42 from the base member 20. However, the convex portion 47, the opening 28 and the pressing surface 85a of the key plate 85 have a following relation. That is, in the state where the locked state of the lock member 50 to the lock portion 1b is released by the key cylinder 80 and the operation member 40 is rotated in the direction of separating the gripping part 42 from the base member 20, as shown in FIG. 14, the key plate 85 is located between one side surface 47a of the convex portion 47 and the inner side 28a of the opening 28, when the opening 28 is seen from an outside of the base member 20.

Subsequently, the operational effects of the lock device 10 configured as described above are described.

In the lock device 10, when the opening and closing body 2 is closed from a state where the opening and closing body 2 is opened from the opening portion 1a of the fixed body 1, the tip end portions 52 and 52 of the pair of lock members 50 and 50 are engaged with the lock portions 1b and 1b of the fixed body 1, so that the opening and closing body 2 is locked in a closed state (refer to FIGS. 16 and 18).

Figure 19:
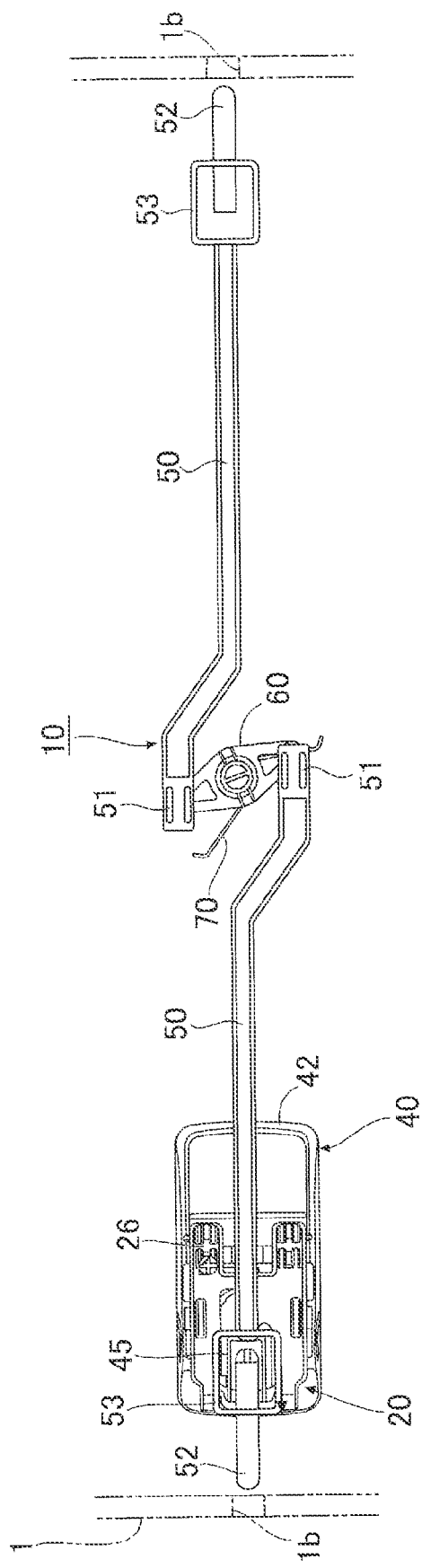
FIG. 19 is a front view depicting the case where the locked state of the opening and closing body is released in the lock device.

From this state, when the gripping part 42 of the operation member 40 is rotated in a direction of separating from the base member 20, as shown in FIG. 13 or FIG. 17, the tip end portion 52 of one lock member 50 is pulled in a direction of not engaging with the lock portion 1b against the rotational urging force of the rotary member 60 and the tip end portion 52 of the other lock member 50 is pulled in a direction of not engaging with the lock portion 1*b* via the rotary member 60 in association with the pulling, as shown in FIG. 19. Therefore, the locked state of the opening and closing body 2 is released, so that the opening and closing body 2 can be opened from the opening portion 1*a* of the fixed body 1.

When it is desired to remove the key cylinder 80 from the cylinder accommodation part 44 of the operation member 40, the operation member 40 is rotated in the direction of separating the gripping part 42 from the base member 20, from the state where the key protrusion 84 is located in the key groove 31 of the base member 20 (refer to FIG. 12A) and the locked state of the lock member 50 to the lock portion 1*b* is released by the key cylinder 80.

Then, as shown in FIG. 13, aiming at the key plate 85, the release tool 100 extending in a rod shape, for example, is inserted into the opening 28 of the wall part 23 of the base member 20 from an outside of the base member 20. Here, as shown in FIG. 15, the release tool 100 is inserted between one side surface 47*a* of the convex portion 47 of the operation member 40 and the inner side 28*a* of the opening 28. Then, the release tool 100 is inserted with being guided by the inner side 28*a* of the opening 28 and one side surface 47*a* of the convex portion 47. The pressing surface 85*a* of the key plate 85 is pressed by the release tool 100, so that the key plate 85 is pushed against the urging force and is pulled in the direction of not engaging with the opening portion 44*b* on the rear side of the cylinder accommodation part 44 and the engaged state of the key plate 85 and the opening portion 44*b* on the rear side of the cylinder accommodation part 44 is thus released. By pulling out the key cylinder 80 from the opening portion 44*a* on the front side of the cylinder accommodation part 44 while keeping the state, the key cylinder 80 can be removed from the cylinder accommodation part 44.

In this way, in the lock device 10, as described above, the engaged state of the key plate 85 and the opening portion 44*b* on the rear side of the cylinder accommodation part 44 is released through the opening 28 provided to the base member 20, so that the key cylinder 80 can be removed from the cylinder accommodation part 44. Therefore, as compared to the structure such as the lock device of PTL 1 where the key cylinder can be removed from the operation member only after the upper member constituted by the two components of the operation member and the upper main body member is removed from the lower member, it is not necessary to provide components such as the upper main body member, so that it is possible to reduce the number of components.

Also, as shown in FIG. 10, in the lock device 10, the pressing surface 85*a* of the key plate 85 is arranged on the further base end portion 41-side of the operation member 40 than the edge portions (the outer edge portion 28*b* and the inner edge portion 28*c*) of the opening 28 formed in the wall part 23 of the base member 20. For this reason, when inserting the release tool 100 into the opening 28 of the wall part 23 from an outside of the base member, the release tool 100 can be inserted with being guided by the edge portions 28*b* and 28*c* and the inner side 28*a* of the opening 28. As a result, the release tool 100 can be easily inserted and the engaged state of the key plate 85 and the opening portion 44*b* on the rear side of the cylinder accommodation part 44 can be easily released, so that the removing operability of the key cylinder 80 can be improved. Alternatively, when pushing the key plate 85 after inserting the release tool 100 into the opening 28, the release tool 100 is contacted to the edge portions 28*b* and 28*c* and the inner side 28*a* of the opening 28 and is twisted or the principle of leverage is used, thereby applying the pushing force. Also in this case, the engaged state of the key plate 85 and the opening portion 44*b* on the rear side of the cylinder accommodation part 44 can be easily released, so that the removing operability of the key cylinder 80 can be improved.

In the present embodiment, the pressing surface 85*a* of the key plate 85 is arranged toward the opening 28 of the base member 20 (refer to FIG. 10). According to this aspect, when inserting the release tool 100 into the opening 28 so as to remove the key cylinder 80 from the cylinder accommodation part 44 of the operation member 40, the pressing surface 85*a* of the key plate 85 is easily pressed to easily push the key plate 85, so that the removing operability of the key cylinder 80 can be further improved.

Also, in the present embodiment, as shown in FIG. 14, in the state where the locked state of the lock member 50 to the lock portion 1*b* is released by the key cylinder 80 and the operation member 40 is rotated in the direction of separating the gripping part 42 from the base member 20, the pressing surface 85*a* of the key plate 85 can be visually recognized through the opening 28 from an outside of the base member 20. According to this aspect, when inserting the release tool 100 into the opening 28 so as to remove the key cylinder 80 from the cylinder accommodation part 44 of the operation member 40, the key plate 85 can be easily visually recognized, so that the key plate 85 can be easily pushed, which can further improve the removing operability of the key cylinder 80.

Also, in the present embodiment, in the state where the locked state of the lock member 50 to the lock portion 1*b* is released by the key cylinder 80 and the operation member 40 is rotated in the direction of separating the gripping part 42 from the base member 20, a part of the pressing surface 85*a* of the key plate 85 is located on the inner side 28*a* of the opening 28, when the opening 28 is seen from an outside of the base member 20 and in a direction orthogonal to the plane direction of the wall part 23, as shown in FIG. 14. According to this aspect, when inserting the release tool 100 into the opening 28 so as to remove the key cylinder 80 from the cylinder accommodation part 44 of the operation member 40, the inner side 28*a* of the opening 28 can be easily used as a guide when inserting the release tool 100 or when applying the pushing force to the pressing surface 85*a* of the key plate 85, as shown in FIG. 15.

Also, in the present embodiment, in the state where the locked state of the lock member 50 to the lock portion 1*b* is released by the key cylinder 80 and the operation member 40 is rotated in the direction of separating the gripping part 42 from the base member 20, the key plate 85 is located between one side surface 47*a* of the convex portion 47 and the inner side 28*a* of the opening 28, when the opening 28 is seen from an outside of the base member 20, as shown in FIG. 14. According to this aspect, when inserting the release tool 100 into the opening 28 so as to remove the key cylinder 80 from the cylinder accommodation part 44 of the operation member 40, one side surface 47*a* of the convex portion 47 can be used as a guide, in addition to the inner side 28*a* of the opening 28, so that the guide ability when inserting the release tool 100 can be further increased.

Figure 20:
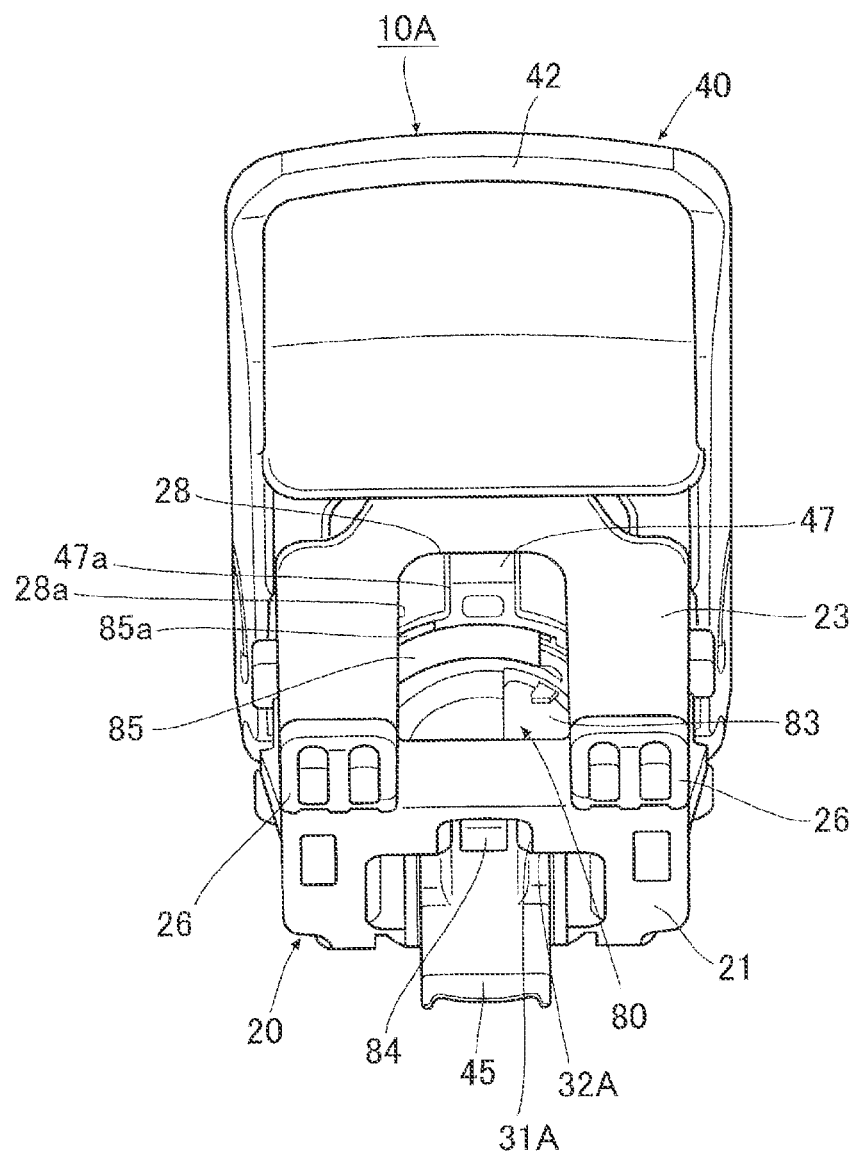
FIG. 20 is a side view in the released state of the key lock, depicting another embodiment of the lock device for an opening and closing body according to the present invention.
Figure 21:
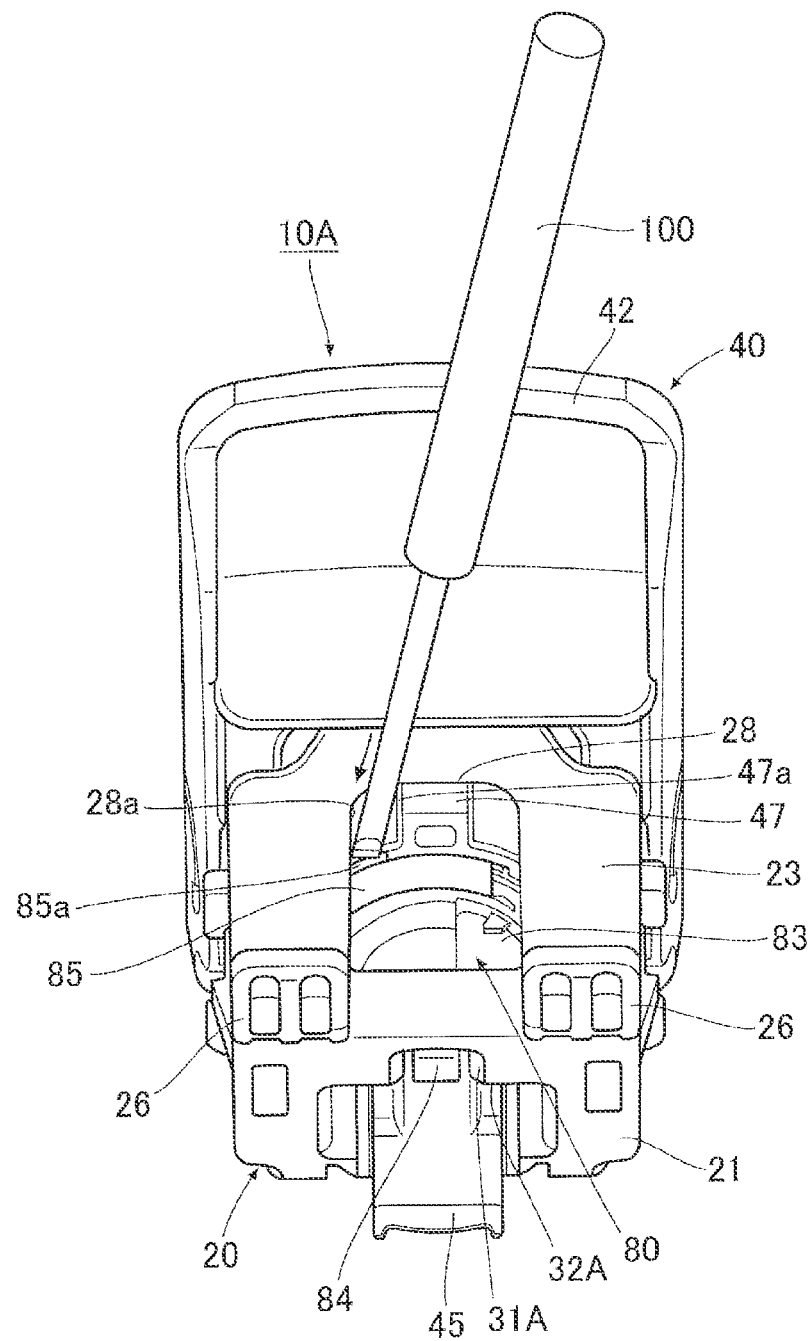
FIG. 21 is a side view depicting a removing state of the key cylinder in the lock device.

FIGS. 20 to 22 depict another embodiment of the lock device for an opening and closing body according to the present invention. Note that, the parts that are substantially the same as the above embodiment are denoted with the same reference signs, and the descriptions thereof are omitted.

As shown in FIGS. 20 and 22, a lock device 10A for an opening and closing body (hereinbelow, "lock device 10A")

of the present embodiment is different from the above embodiment, in terms of a key groove 31A of the base member 20 and arrangement of the key plate 85 of the key cylinder 80.

That is, in the present embodiment, as shown in FIG. 22, the bottom wall 21 of the base member 20 is formed with a thin groove-shaped key groove 31A from a center of the slide groove 21a in the width direction toward one end-side of the bottom wall 21 in the longitudinal direction, and the other end-side of the key groove 31A in the longitudinal direction is provided with a key contact portion 32A.

Figure 22A:
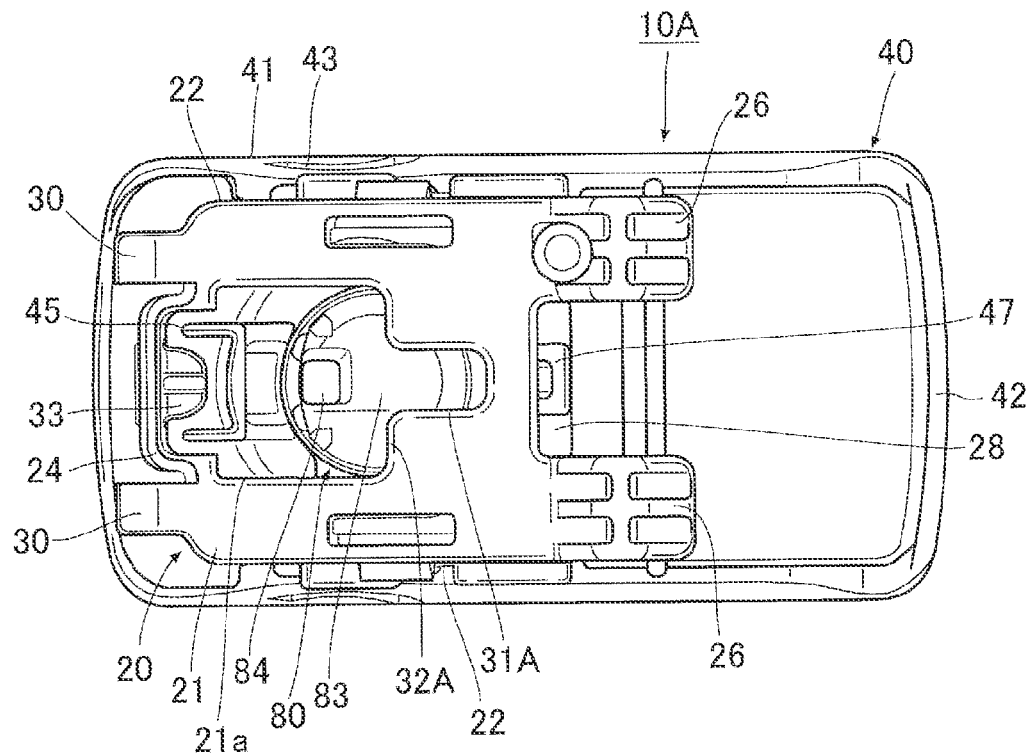
FIGS. 22A and 22B are bottom views of the lock device, where
Figure 22B:
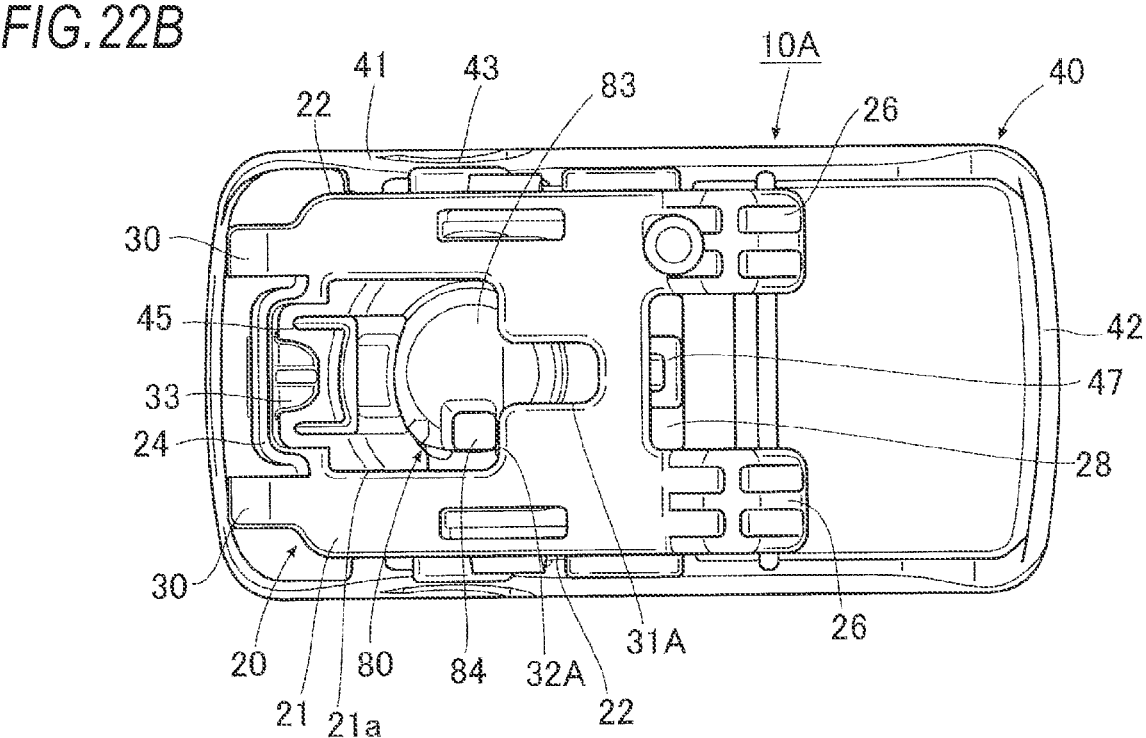

As shown in FIG. 22A, when the key protrusion 84 is located on an extension line of the key groove 31A, the operation member 40 can be rotated in the direction of separating the gripping part 42 from the base member 20, so that the locked state of the lock member 50 to the lock portion 1b can be released. On the other hand, as shown in FIG. 22B, in a state where the key protrusion 84 is close to the key contact portion 32A, the rotation of the operation member 40 is regulated, so that the locked state of the lock member 50 to the lock portion 1b is kept.

As shown in FIG. 20, the pressing surface 85a of the outer periphery of the key plate 85 is arranged toward the opening 28 of the base member 20, and a part of the pressing surface 85a of the key plate 85 is located on the inner side 28a of the opening 28, when the opening 28 is seen from an outside of the base member 20 and in a direction orthogonal to the plane direction of the wall part 23. In the case of the lock device 10A of the present embodiment, an occupying area of the pressing surface 85a of the key plate 85 to an opening area of the opening 28 is larger, as compared to the lock device 10 of the above embodiment (refer to FIG. 20).

Also in the lock device 10A of the present embodiment, the operational effects similar to the above embodiment are obtained. Also, in the lock device 10A of the present embodiment, as described above, since the occupying area of the pressing surface 85a of the key plate 85 to the opening area of the opening 28 is larger, as compared to the lock device 10 of the above embodiment, it is possible to obtain an effect that the key plate 85 can be easily pushed by the release tool 100.

Figure 23:
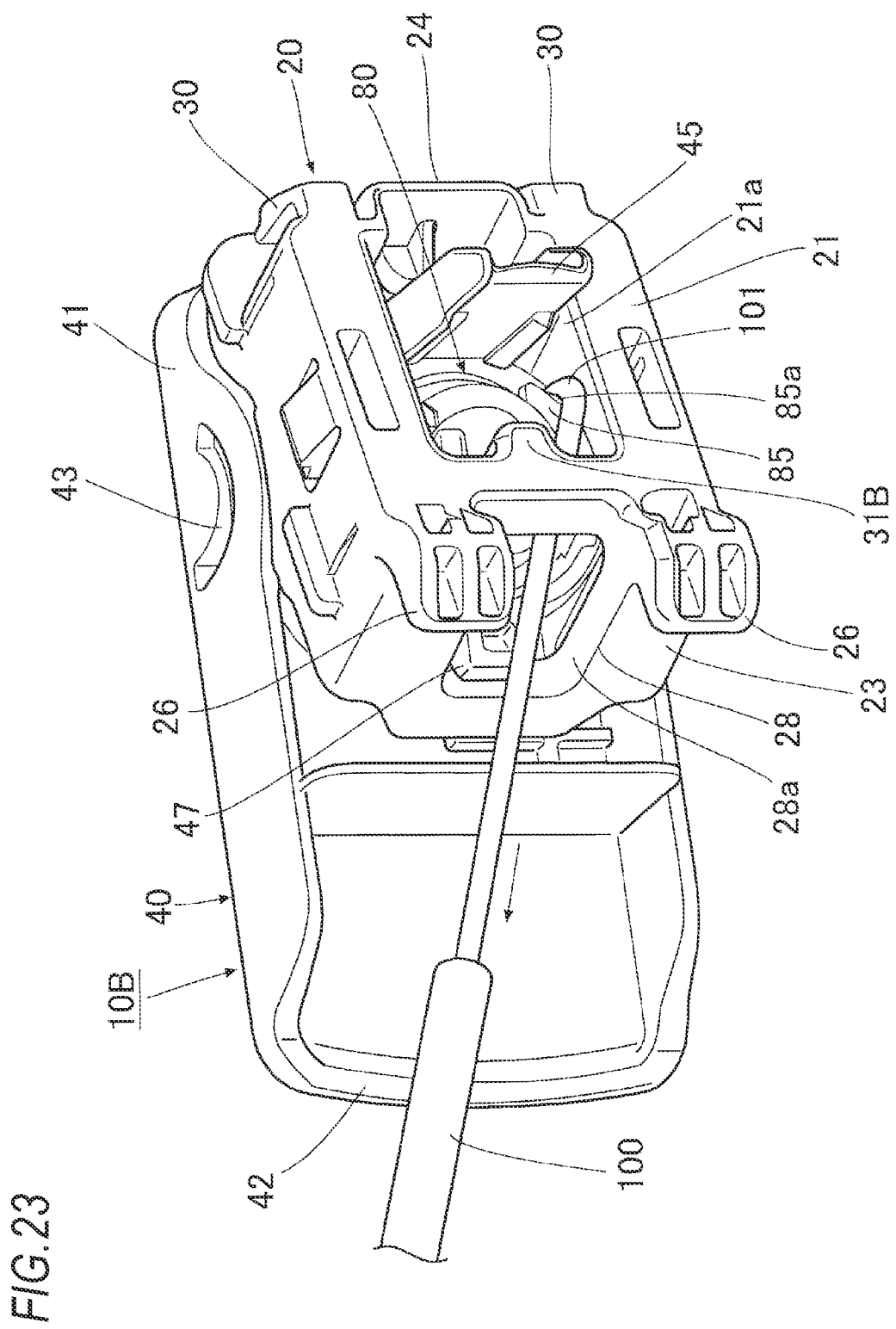
FIG. 23 is a perspective view depicting a removing state of the key cylinder, showing still another embodiment of the lock device for an opening and closing body according to the present invention.

FIGS. 23 and 24 depict still another embodiment of the lock device for an opening and closing body according to the present invention. Note that, the parts that are substantially the same as the above embodiment are denoted with the same reference signs, and the descriptions thereof are omitted.

A lock device 10B for an opening and closing body (hereinbelow, "lock device 10B") of the present embodiment is different from the above embodiment, in terms of a key groove 31B of the base member 20 and arrangement of the key plate 85 of the key cylinder 80.

That is, in the present embodiment, as shown in FIG. 24, a key contact portion 32B protrudes from the other end-side of the slide groove 21a in the longitudinal direction and at a center in the width direction thereof. Also, a short and small groove-shaped key groove 31B is formed at the other end portion of the slide groove 21a in the longitudinal direction and at a position close to the key contact portion 32B.

Figure 24A:
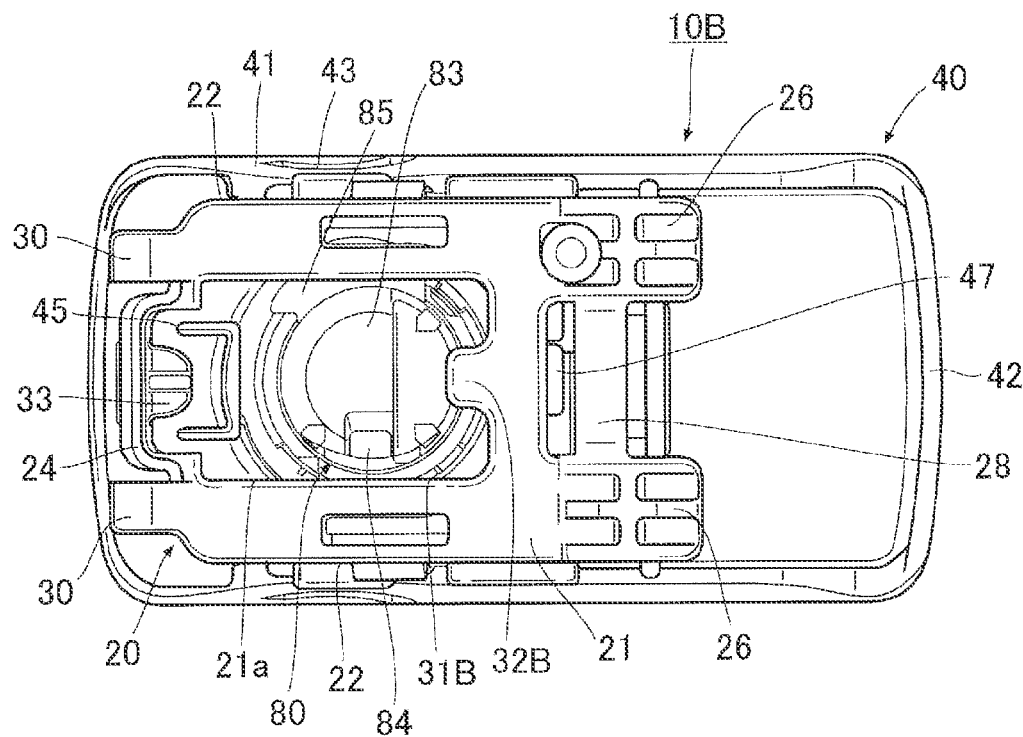
FIGS. 24A and 24B are bottom views of the lock device, where
Figure 24B:
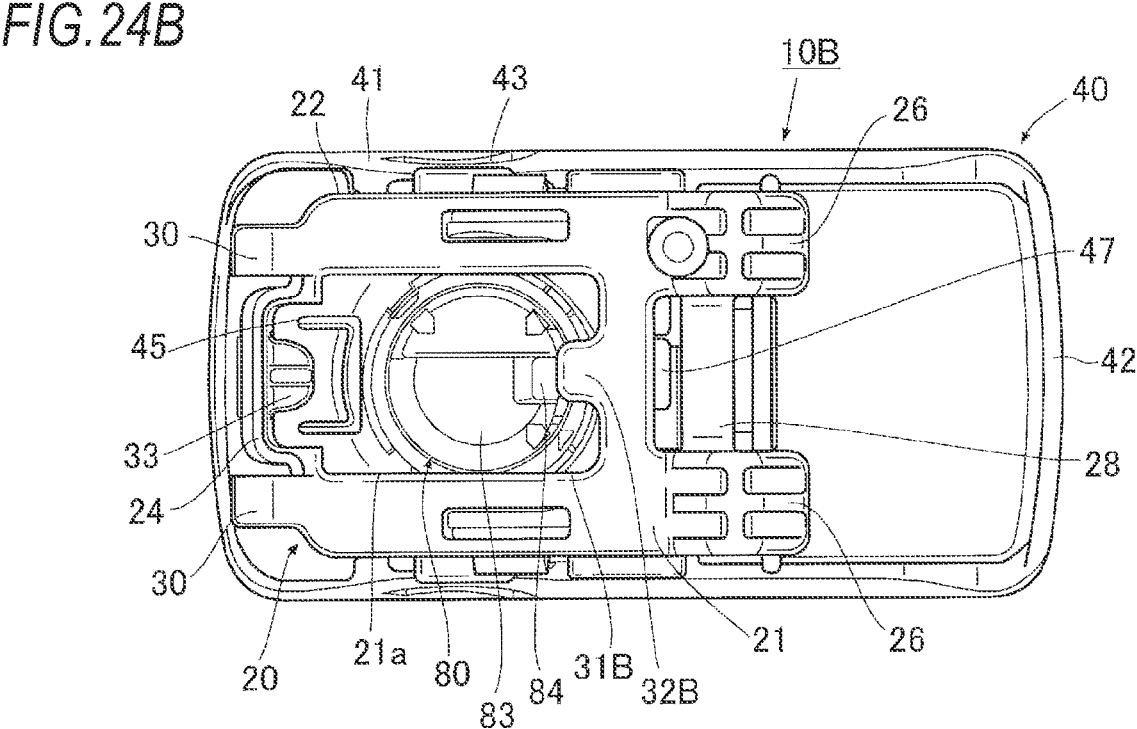

As shown in FIG. 24A, when the key protrusion 84 is located in the key groove 31B, the operation member 40 can be rotated in the direction of separating the gripping part 42 from the base member 20, so that the locked state of the lock member 50 to the lock portion 1b can be released. On the other hand, as shown in FIG. 24B, in a state where the key protrusion 84 is close to the key contact portion 32B, the rotation of the operation member 40 is regulated, so that the locked state of the lock member 50 to the lock portion 1b is kept.

Also, as shown in FIG. 23, in the present embodiment, the pressing surface 85a of the key plate 85 is arranged toward an opposite direction to the opening 28 of the base member 20.

Note that, in the present embodiment, the release tool 100 has a tip end portion 101 bent into a claw shape. When it is desired to remove the key cylinder 80 from the cylinder accommodation part 44 of the operation member 40, the release tool 100 is inserted into the opening 28 and the tip end portion 101 of the release tool 100 is then hooked to the pressing surface 85a of the key plate 85 in the cylinder arranging space 25 of the base member 20. In this state, the release tool 100 is returned toward an opposite direction to the insertion direction into the opening 28 (refer to an arrow in FIG. 23), thereby pushing the key plate 85 against the urging force in the direction of not engaging with the opening portion 44b on the rear side of the cylinder accommodation part 44. As a result, the engaged state of the key plate 85 and the opening portion 44b on the rear side of the cylinder accommodation part 44 can be released, so that the key cylinder 80 can be removed from the cylinder accommodation part 44.

The present invention is not limited to the above embodiment. A variety of modified embodiments can be made within the scope of the gist of the present invention, and such modified embodiments are also included in the scope of the present invention.

REFERENCE SIGNS LIST

1: fixed body
1a: opening portion
1b: lock portion
2: opening and closing body
10, 10A, 10B: lock device for an opening and closing body (lock device)
20: base member
23: wall part
25: cylinder arranging space
28: opening
28a: inner side
28b: outer edge portion
28c: inner edge portion
29: rotation support portion
40: operation member
41: base end portion
42: gripping part
44: cylinder accommodation part
44b: opening portion on rear side
47: convex portion
47a: one side surface
50: lock member
60: rotary member
70: first urging means
75: second urging means
80: key cylinder
81: main body part
85: key plate
85a: pressing surface
100: release tool

The invention claimed is:

1. A lock device for an opening and closing body that is attached to an opening portion of a fixed body in an openable and closable manner, the lock device comprising:

a lock portion provided on the opening portion of the fixed body or the opening and closing body;

a lock member configured to operate via an operation member to be engaged with or disengaged from the lock portion;

a base member having a rotation support portion rotationally supporting the operation member; and a key cylinder capable of keeping or releasing a locked state of the lock member to the lock portion, wherein the operation member includes a base end portion rotationally supported to the rotation support portion, a gripping part provided on a tip end-side and a tubular cylinder accommodation part accommodating the key cylinder, and is configured to slide the lock member in a direction of not engaging with the lock portion by a rotation of the gripping part in a direction of separating from the base member, the base member includes a cylinder arranging space in which the cylinder accommodation part is arranged, a wall part located on a tip end-side of the operation member, and an opening formed in the wall part and communicating with the cylinder arranging space, the key cylinder includes a main body part accommodated in the cylinder accommodation part and extending in an axial direction and a key plate protruding and urged in a radially outer direction of the main body part and configured to engage with an opening portion on a rear side of the cylinder accommodation part to prevent the main body part from coming off, the key plate includes a pressing surface configured to be pressed against an urging force of the key plate to enable the key plate to be pushed in a direction of not engaging with the opening portion on the rear side of the cylinder accommodation part, and the pressing surface is exposed into the cylinder arranging space and is arranged on a further base end portion-side of the operation member than an edge portion of the opening of the wall part, and the opening has a closed periphery.

2. The lock device for an opening and closing body according to claim 1, wherein the pressing surface of the key plate is arranged toward the opening.

3. The lock device for an opening and closing body according to claim 2, wherein in a state where a locked state of the lock member to the lock portion is released by the key cylinder and the operation member is rotated in a direction of separating the gripping part from the base member, the pressing surface is configured to be visually recognized through the opening from an outside of the base member.

4. The lock device for an opening and closing body according to claim 3, wherein when the opening is seen from an outside of the base member and in a direction orthogonal to a plane direction of the wall part, a part of the pressing surface is located on an inner side of the opening.

5. A lock device for an opening and closing body that is attached to an opening portion of a fixed body in an openable and closable manner, the lock device comprising:

a lock portion provided on the opening portion of the fixed body or the opening and closing body;

a lock member configured to operate via an operation member to be engaged with or disengaged from the lock portion;

a base member having a rotation support portion rotationally supporting the operation member; and a key cylinder capable of keeping or releasing a locked state of the lock member to the lock portion, wherein the operation member includes a base end portion rotationally supported to the rotation support portion, a gripping part provided on a tip end-side and a tubular cylinder accommodation part accommodating the key cylinder, and is configured to slide the lock member in a direction of not engaging with the lock portion by a rotation of the gripping part in a direction of separating from the base member, the base member includes a cylinder arranging space in which the cylinder accommodation part is arranged, a wall part located on a tip end-side of the operation member, and an opening formed in the wall part and communicating with the cylinder arranging space, the key cylinder includes a main body part accommodated in the cylinder accommodation part and extending in an axial direction and a key plate protruding and urged in a radially outer direction of the main body part and configured to engage with an opening portion on a rear side of the cylinder accommodation part to prevent the main body part from coming off, the key plate includes a pressing surface configured to be pressed against an urging force of the key plate to enable the key plate to be pushed in a direction of not engaging with the opening portion on the rear side of the cylinder accommodation part, and the pressing surface is exposed into the cylinder arranging space and is arranged on a further base end portion-side of the operation member than an edge portion of the opening of the wall part, and the operation member is provided with a convex portion that is engaged with an inner side of the opening to regulate a rotating angle of the operation member when the gripping part is rotated in the direction of separating from the base member.

6. The lock device for an opening and closing body according to claim 5, wherein when the opening is seen from an outside of the base member, the key plate is located between one side surface of the convex portion and the inner side of the opening.

* * * * *